United States Patent
Oh et al.

(10) Patent No.: US 11,455,632 B2
(45) Date of Patent: Sep. 27, 2022

(54) METHOD FOR MEDIATING VIRTUAL ASSET TRANSMISSION

(71) Applicants: Dunamu Inc., Seoul (KR); Lambda256, Seoul (KR)

(72) Inventors: Jae Hoon Oh, Seongnam-si (KR); Hyeok Choi, Seoul (KR)

(73) Assignees: Dunamu Inc., Seoul (KR); Lambda256, Seoul (KR)

( * ) Notice: Subject to any disclaimer, the term of this patent is extended or adjusted under 35 U.S.C. 154(b) by 0 days.

(21) Appl. No.: 17/410,869

(22) Filed: Aug. 24, 2021

(65) Prior Publication Data
US 2022/0058646 A1 Feb. 24, 2022

(30) Foreign Application Priority Data

Aug. 24, 2020 (KR) .......................... 10-2020-0105926
Nov. 30, 2020 (KR) .......................... 10-2020-0164188

(51) Int. Cl.
*G06Q 20/40* (2012.01)
*G06Q 20/06* (2012.01)
*G06Q 20/22* (2012.01)

(52) U.S. Cl.
CPC ......... *G06Q 20/401* (2013.01); *G06Q 20/065* (2013.01)

(58) Field of Classification Search
CPC ........................... G06Q 20/401; G06Q 20/065
(Continued)

(56) References Cited

U.S. PATENT DOCUMENTS

2021/0099293 A1* 4/2021 Aleksander ............ H04L 9/3271
2021/0272106 A1* 9/2021 Hayner ................. G06Q 20/389
2021/0304200 A1* 9/2021 Doney ........................ H04L 9/30

FOREIGN PATENT DOCUMENTS

KR       102296387 B1 * 9/2021
WO   WO-2021107195 A1 * 6/2021 ............ G06Q 20/10
WO   WO-2021177639 A1 * 9/2021

OTHER PUBLICATIONS

Hardjono et al. ("Wallet Attestations for Virtual Asset Service Providers and Crypto-Assets Insurance", MIT Connection Science and Engineering, Massachusetts Institute of Technology, Jun. 1, 2020, 35 pages) (Year: 2020).*

(Continued)

*Primary Examiner* — James D Nigh
(74) *Attorney, Agent, or Firm* — K&L Gates LLP

(57) ABSTRACT

A method for mediating virtual asset transmission is provided. The method comprises receiving a first information on virtual asset to be transmitted from a first user to a second user from a first virtual asset service provider (VASP) server managing virtual asset of the first user, transmitting a verification request as to whether information on the second user included in the received first information is correct to a second VASP server managing virtual asset of the second user, receiving a verification result indicating that the information on the second user is correct from the second VASP server as a response to the verification request, and transmitting the received verification result to the first VASP server. The method further comprises transmitting virtual asset update request of the second user to the second VASP server if it is determined that the transaction has been recorded in the blockchain.

20 Claims, 9 Drawing Sheets

(58) Field of Classification Search
USPC .......................................................... 705/75
See application file for complete search history.

(56) References Cited

OTHER PUBLICATIONS

Hardjono et al. ("Privacy-Preserving Claims Exchange Networks for Virtual Asset Service Providers", 978-1-7281-6680-3/20, IEEE, Mar. 10, 2020, 8 pages) (Year: 2020).*

* cited by examiner

| TYPE | PUBLIC KEY | APPLICATION TARGET |
|---|---|---|
| FIRST SECURITY LEVEL | PUB_K1 | Transaction1 |
| | PUB_K2 | Transaction2 |
| | PUB_K3 | Transaction3 |
| SECOND SECURITY LEVEL | PUB_K10 | user1 |
| | PUB_K11 | user2 |
| THIRD SECURITY LEVEL | PUB_K21 | VASP#2 |

METHOD FOR MEDIATING VIRTUAL ASSET TRANSMISSION

This application claims the benefit of Korean Patent Application No. 10-2020-0105926, filed on Aug. 24, 2020, and Korean Patent Application No. 10-2020-0164188, filed on Nov. 30, 2020, in the Korean Intellectual Property Office, the disclosure of which is incorporated herein by reference in its entirety.

BACKGROUND

Field

The disclosure relates mediating virtual asset transmissions, specifically, between a recipient-side virtual asset service provider (VASP) and a sender-side VASP.

Related Art

Virtual assets represented by Bitcoin are recognized as assets without borders, and the number of places where they can be used (e.g., offline stores, online stores, etc.) is increasing. The virtual assets are sometimes exchanged for real assets, and their value fluctuates frequently. In addition, the types of virtual assets are diversifying, and the number of virtual asset service providers (VASPs), which act on behalf of virtual asset transactions and manage them, is also increasing.

These virtual asset transactions are sometimes conducted anonymously and used to hide the source of funds. Accordingly, in order to prohibit money laundering and terrorist financing using virtual assets, FATF (Financial Action Task Force on Money Laundering) provides obligations on information that a VASP should provide when sending virtual assets, and requires a VASP to comply with the above obligations.

However, in order for a VASP to comply with the FATF obligations, there is a problem that the design of the current system should be changed. In addition, when each VASP independently changes the system to comply with FATF obligations, there may be problems with protocol compatibility between VASPs.

SUMMARY

Embodiments described herein provide a virtual asset transmission mediation method that more reliably verifies a recipient when a virtual asset is transmitted from a sender VASP node to a recipient VASP node.

Embodiments described herein may provide a method of mediating virtual asset transmission more safely by enhancing security when transmitting and receiving recipient information.

The embodiments described herein may provide a virtual asset transmission mediation method that can integrate, verify, and manage virtual asset transmission occurring in each VASP node while complying with the obligations proposed by FATA.

Embodiments described herein may provide a virtual asset transmission mediation method capable of selectively updating the virtual asset of the recipient through the verification result and preventing the virtual asset from being delivered to a criminal group or the like.

It will be understood from the description below that the embodiments described herein provide another method and apparatus thereof not mentioned above.

Method for Use in Virtual Asset Transmission

One aspect of the disclosure provides a method for use in a virtual asset transmission from a first account of a first user at a first virtual asset service provider (VASP) to a second account of a second user at a second virtual asset service provider (VASP). The method comprises: receiving, by a verification node comprising a computing device connected to a computer communication network comprising a blockchain network, information about the second user which comprises an account number of the second account at the second VASP; sending, by the verification node to the second VASP, an electronic request for verifying the information about the second user, which causes the second VASP to process verification of the information about the second user; receiving, by the verification node from the second VASP, an electronic verification result confirming that the information about the second user is valid; subsequently receiving by the verification node from the first VASP, an electronic request for verifying a blockchain record for a transmission of a virtual asset from the first user to the second user, wherein the electronic request for verifying the blockchain record comprises transaction information associated with the transmission; upon receipt of the electronic request for verifying a blockchain record, determining, by the verification node, if the transmission has been recorded on the blockchain network, wherein determining uses at least part of the transaction information received from the first VASP; and upon determining that the transmission has been recorded on the blockchain network, sending, by the verification node to the second VASP, an electronic request to update the second account of the second user at the second VASP about the transmission of the virtual asset from the first user to the second user, wherein the verification node does not belong to either the first VASP or the second VASP.

In the foregoing method, subsequent to the transmission, the verification node electronically stores in a storage device a transaction record may comprise two or more selected from the group consisting of a type of the virtual asset, a quantity of the virtual asset, a name of the first user, a nationality of the first user, an address of the first user, an account number of the first user at the first VASP, the date of birth of the first user, the place of birth of the first user, a name of the second user, and the account number of the second user at the second VASP, wherein the storage device does not belong to either the first VASP or the second VASP. Subsequent to the verification node's receipt of the electronic verification result and prior to the verification node's receipt of the electronic request for verifying a blockchain record, the first VASP may initiate recordkeeping for the transmission of the virtual asset from the first user to the second user in the blockchain network.

In the foregoing method, subsequent to the verification node's receipt of the electronic verification result and prior to the verification node's receipt of the electronic request for verifying a blockchain record, a transaction record for the transmission of the virtual asset from the first user to the second user may be recorded in the blockchain network, wherein the transaction record for the transmission may comprise two or more selected from the group consisting of a type of the virtual asset, a quantity of the virtual asset, a name of the first user, a nationality of the first user, an address of the first user, an account number of the first user at the first VASP, the date of birth of the first user, the place of birth of the first user, a name of the second user, and the account number of the second user at the second VASP.

In the foregoing method, the transaction record may be recorded in the blockchain network in response to the first VASP's request for keeping the transaction record in the blockchain network. A blockchain transaction identifier may be generated based on at least part of the transaction record kept in the blockchain network. The first VASP may generate the blockchain transaction identifier using the transaction record that it sent to the blockchain network with the request for keeping the transaction record. The transaction information from the first VASP may comprise the blockchain transaction identifier. The verification node's determining may comprise: communicating with the blockchain network to receive at least part of the transaction record; and processing the at least part of the transaction record received from the blockchain network, wherein the verification nodes may determine that the transmission has been recorded on the blockchain network if the at least part of the transaction record may generate a code identical to the blockchain transaction identifier received from the first VASP.

In the foregoing method, prior to the verification node's receipt of the information about the second user, the first VASP may assign a unique identifier to a then-future transaction in response to the first user's request to the first VASP for the transmission of the virtual asset to the second user and then send the information about the second user and the unique identifier to the second VASP. The information about the second user received from the first VASP may be encrypted, wherein the verification node may send the encrypted information about the second user to the second VASP with the electronic request for verifying the information about the second user. Prior to receiving the information about the second user, the verification node may send to the second VASP an electronic request for a public key for a then-future transaction, receive a public key for the then-future transaction from the second VASP, and forward the public key to the first VASP, wherein the then-future transaction may be the transmission of the virtual asset from the first user to the second user. The information about the second user received from the first VASP may be encrypted using the public key, wherein the verification node may send the encrypted information about the second user to the second VASP with the electronic request for verifying the information about the second user, which causes the second VASP to decrypt the encrypted information using the public key and process verification of the information about the second user.

Another aspect of the disclosure provides method for use in a virtual asset transmission from a first account of a first user at a first virtual asset service provider (VASP) to a second account of a second user at a second virtual asset service provider (VASP). The method comprises: receiving, by a verification node comprising a computing device connected to a computer communication network comprising a blockchain network, information about the second user and a unique identifier assigned to a then-future transaction for a transmission of a virtual asset from the first user to the second user, wherein the information about the second user comprises an account number of the second account at the second VASP; sending, by the verification node to the second VASP, an electronic request for verifying the information about the second user, which causes the second VASP to process verification of the information about the second user; receiving, by the verification node from the second VASP, an electronic verification result confirming that the information about the second user is valid; subsequently communicating with the blockchain network, by the verification node, to determine if the transmission has been recorded on the blockchain network, wherein determining comprises uses the unique identifier assigned to the transmission; and upon determining that the transmission has been recorded on the blockchain network, sending, by the verification node to the second VASP, an electronic request to update the second account of the second user at the second VASP about the transmission of the virtual asset from the first user to the second user, wherein the verification node does not belong to either the first VASP or the second VASP.

In the foregoing method, subsequent to the transmission, the verification node electronically stores in a storage device a transaction record may comprise two or more selected from the group consisting of a type of the virtual asset, a quantity of the virtual asset, a name of the first user, a nationality of the first user, an address of the first user, an account number of the first user at the first VASP, the date of birth of the first user, the place of birth of the first user, a name of the second user, and the account number of the second user at the second VASP, wherein the storage device does not belong to either the first VASP or the second VASP. Subsequent to the verification node's receipt of the electronic verification result and prior to the verification node's receipt of the electronic request for verifying a blockchain record, the first VASP may initiate recordkeeping for the transmission of the virtual asset from the first user to the second user in the blockchain network.

In the foregoing method, subsequent to the verification node's receipt of the electronic verification result and prior to the verification node's receipt of the electronic request for verifying a blockchain record, a transaction record for the transmission of the virtual asset from the first user to the second user may be recorded in the blockchain network, wherein the transaction record for the transmission may comprise the unique identifier and two or more selected from the group consisting of a type of the virtual asset, a quantity of the virtual asset, a name of the first user, a nationality of the first user, an address of the first user, an account number of the first user at the first VASP, the date of birth of the first user, the place of birth of the first user, a name of the second user, and the account number of the second user at the second VASP.

In the foregoing method, the transaction record may be recorded in the blockchain network in response to the first VASP's request for keeping the transaction record in the blockchain network. The information about the second user received from the first VASP may be encrypted, wherein the verification node may send the encrypted information about the second user to the second VASP with the electronic request for verifying the information about the second user. Prior to receiving the information about the second user, the verification node may send to the second VASP an electronic request for a public key for a then-future transaction, receive a public key for the then-future transaction from the second VASP, and forward the public key to the first VASP, wherein the then-future transaction may be the transmission of the virtual asset from the first user to the second user. The information about the second user received from the first VASP may be encrypted using the public key, wherein the verification node may send the encrypted information about the second user to the second VASP with the electronic request for verifying the information about the second user, which causes the second VASP to decrypt the encrypted information using the public key and process verification of the information about the second user.

Method for Mediating Virtual Asset Transmission

An aspect of the present disclosure provides a method for mediating virtual asset transmission. The method comprises receiving, from a first virtual asset service provider (VASP) server managing virtual asset of a first user, a first information on virtual asset to be transmitted from the first user to a second user; transmitting, to a second VASP server managing virtual asset of the second user, a verification request as to whether information on the second user included in the received first information is correct; receiving, from the second VASP server as a response to the verification request, a verification result indicating that the information on the second user is correct; transmitting the received verification result to the first VASP server; upon receiving a response from the first VASP server, determining whether a transaction corresponding to transmission of the virtual asset to be transmitted has been recorded in a blockchain; and transmitting virtual asset update request of the second user to the second VASP server based on determining that the transaction has been recorded in the blockchain.

In embodiments, determining whether the transaction has been recorded in the blockchain may comprise generating a first identifier for the virtual asset to be transmitted; determining whether a transaction with first metadata including the first identifier has been recorded in the blockchain after transmission of the verification result; in response to determining that the transaction with the first metadata has been recorded in the blockchain, obtaining a second information on the recorded transaction from the blockchain; determining whether first item fields of the first information and second item fields of the second information correspond to each other; and determining that the transaction corresponding to the transmission of the virtual asset to be transmitted has been recorded in the blockchain based on determining that the first item fields and the second item fields correspond to each other.

In embodiments, determining whether the transaction with the first metadata has been recorded in the blockchain may comprise obtaining a plurality of transactions recorded in the blockchain; and finding a transaction, among the plurality of transactions, with metadata including the first identifier.

In embodiments, the first item fields may include at least one of information on a type of the virtual asset to be transmitted, information on a quantity, and information on a recipient, and the second item fields may include at least one of information on a type of a virtual asset, information on a quantity, and information on a recipient in the transaction including the first metadata.

In embodiments, determining whether the transaction has been recorded in the blockchain may comprise: in response to the transmission of the verification result, receiving, from the first VASP server, a second identifier of a transaction corresponding to the transmission of the virtual asset to be transmitted; determining whether a transaction corresponding to the received second identifier has been recorded in the blockchain; in response to determining that the transaction corresponding to the second identifier has been recorded in the blockchain, obtaining a third information on a transaction corresponding to the second identifier from the blockchain; determining whether first item fields of the first information and third item fields of the third information correspond to each other; and determining that the transaction corresponding to the transmission of the virtual asset to be transmitted has been recorded in the blockchain based on determining that the first item fields and the third item fields correspond to each other.

In embodiments, determining whether the transaction corresponding to the second identifier has been recorded in the blockchain may comprise: obtaining a third identifier for each of one or more transactions among transactions recorded in the blockchain; and finding a transaction corresponding to the second identifier based on determining whether the obtained third identifier corresponds to the second identifier.

The method may further comprise: identifying a security level applied to the transmission of the virtual asset; and obtaining a public key for encrypting information on the second user based on the identified security level, wherein different ranges of applying the obtained public key is set according to different security levels, and the information on the second user is encrypted with the obtained public key. The range of applying the obtained public key may decrease as intended security level increases.

In embodiments, the public key may be dedicated to transaction applied only to the transmission of the virtual asset based on the security level being a first security level, the public key may be dedicated to the first user or the second user based on the security level being a second security level, and the public key may be dedicated to the first VASP server or the second VASP server based on the security level being a third security level.

In embodiments, obtaining the public key may comprise: transmitting the determined security level to the second VASP server; and receiving the public key corresponding to the security level from the second VASP server, wherein receiving from the first VASP server comprises: transmitting the public key to the first VASP server; and receiving recipient information encrypted with the public key from the first VASP server.

Another aspect of the present disclosure provides a method for mediating virtual asset transmission. The method comprises: receiving, from a first virtual asset service provider (VASP) server managing virtual asset of a first user, a first information on virtual asset to be transmitted from the first user to a second user; determining whether a transaction corresponding to transmission of the virtual asset to be transmitted has been recorded in a blockchain; based on determining that the transaction has been recorded in the blockchain and a second VASP server managing virtual asset of the second user is a non-member, reserving a verification task of a second user; in response to the second VASP server joining as a member, performing the reserved verification task of the second user, the verification task including transmitting a verification request as to whether information on the second user included in the first information is correct to the second VASP server; and in response to receiving from the second VASP server a verification result indicating that the information on the second user is correct, transmitting a virtual asset update request of the second user to the second VASP server.

In embodiments, transmitting the verification request to the second VASP server may further comprise: obtaining a first public key of the second VASP server; providing the obtained first public key to the first VASP server; receiving, from the first VASP server, a second public key of the first VASP server encrypted with the first public key; and transmitting the encrypted second public key to the second VASP server, wherein the information on the second user is encrypted with a private key of the first VASP server, the encrypted second public key is decrypted with a private key of the second VASP server, and the encrypted information on the second user is decrypted with the decrypted second public key.

The method may further comprise identifying a security level applied to the transmission of the virtual asset. And, obtaining the first public key may comprise, receiving, from the second VASP server, a first public key corresponding to the applied security level.

In embodiments, transmitting the verification request to the second VASP server may further comprise: obtaining a public key of the second VASP server; transmitting the obtained public key to the first VASP server; receiving information on the second user encrypted with the public key from the first VASP server; and transmitting the encrypted second user information to the second VASP server, wherein the encrypted information on the second user is decrypted with a private key of the second VASP server.

Another aspect of the present disclosure provides a method for mediating virtual asset transmission that comprises: receiving information on virtual asset to be transmitted from a first user to a second user; transmitting a verification request as to whether information on the second user is correct, to a second VASP server managing virtual asset of the second user through a verification node; and recording a transaction corresponding to transmission of the virtual asset to be transmitted in a blockchain in response to receiving a verification result indicating that the information on the second user is correct from the verification node.

In embodiments, transmitting to the second VASP server may comprise: identifying a security level applied to transmission of the virtual asset; obtaining a public key corresponding to the identified security level; encrypting information on a second user with the obtained public key; and transmitting the encrypted information on the second user to the second VASP server through the verification node.

Another aspect of the present disclosure provides a method mediating virtual asset transmission. The method comprises: providing a public key to a virtual asset service provider server managing virtual asset of a first user through a verification node in response to transmission of virtual asset being scheduled from a first user to a second user; receiving information on the second user from the verification node, the information being encrypted with the public key by a virtual asset service provider server; verifying whether the encrypted information on the second user is correct by decrypting the encrypted information on the second user with a private key; transmitting the verification result to the verification node; and in response to receiving a virtual asset update allowing signal from the verification node, updating virtual asset of the second user by reflecting a quantity of transmitted virtual asset.

In embodiments, providing the public key may comprise: identifying a security level applied to transmission of the virtual asset; providing a public key used only for transmission of the virtual asset to the virtual asset service provider server through the verification node based on the security level being a first security level; providing a public key dedicated to a first user to the virtual asset service provider server through the verification node based on the security level being a second security level; and providing a public key dedicated to the virtual asset service provider server to the virtual asset service provider server based on the security level being a third security level.

According to an embodiment, a method for mediating virtual asset transmission may comprise receiving a first information on virtual asset to be transmitted from a first user to a second user from a first virtual asset service provider (VASP) server managing virtual asset of the first user, transmitting a verification request as to whether information on the second user included in the received first information is correct to a second VASP server managing virtual asset of the second user, receiving a verification result indicating that the information on the second user is correct from the second VASP server as a response to the verification request, transmitting the received verification result to the first VASP server, determining whether a transaction corresponding to transmission of the virtual asset to be transmitted is recorded in a blockchain as a result of a response of the first VASP server to the transmission of the verification result, and transmitting virtual asset update request of the second user to the second VASP server if it is determined that the transaction is recorded in the blockchain.

According to an embodiment, wherein determining whether the transaction is recorded in the blockchain may comprise preparing a first identifier for the virtual asset to be transmitted, determining whether a transaction including metadata including information corresponding to the first identifier is recorded in the blockchain after transmission of the verification result, obtaining a second information on the transaction including the metadata from the blockchain if it is determined that the transaction including the metadata is recorded in the blockchain, verifying whether at least one or more specific first items included in the first information and at least one or more specific second items included in the obtained second information correspond to each other, and determining that a transaction corresponding to the transmission of the virtual asset to be transmitted is recorded in the blockchain if it is verified that the at least one or more first items and the at least one or more second items correspond to each other.

According to an embodiment, wherein determining whether the transaction including the metadata is recorded in the blockchain may comprise obtaining metadata included in at least one or more transactions among transactions recorded in the blockchain, checking whether the obtained metadata includes information corresponding to the first identifier, and finding a transaction including metadata including information corresponding to the first identifier using a result of the check.

According to an embodiment, wherein verifying whether the at least one or more first items and the at least one or more second items correspond to each other may comprise preparing at least one of information on a type of the virtual asset to be transmitted, information on a quantity, and information on a recipient as the at least one or more first items, preparing at least one or more of information on a type of a virtual asset, information on a quantity, and information on a recipient in the transaction including the metadata as the at least one or more second items, and determining whether the prepared at least one or more first items and the prepared at least one or more second items correspond to each other.

According to an embodiment, wherein determining whether the transaction is recorded in the blockchain may comprise receiving a second identifier of a transaction corresponding to the transmission of the virtual asset to be transmitted from the first VASP server in response to the transmission of the verification result, determining whether a transaction corresponding to the received second identifier is recorded in the blockchain, obtaining a third information on a transaction corresponding to the second identifier from the blockchain if it is determined that the transaction corresponding to the second identifier is recorded in the blockchain, verifying whether at least one or more specific first items included in the first information and at least one or more specific third items included in the obtained third information correspond to each other, and determining that a transaction corresponding to the transmission of the virtual asset to be transmitted is recorded in the blockchain if it is verified that the at least one or more first items and the at least one or more third items correspond to each other.

According to an embodiment, wherein determining whether a transaction corresponding to the second identifier is recorded in the blockchain may comprise, obtaining a third identifier for each of at least one or more transactions among transactions recorded in the blockchain, checking whether the obtained third identifier corresponds to the second identifier, and finding a transaction corresponding to the second identifier using a result of the check.

According to another embodiment, a method for mediating virtual asset transmission may comprise receiving a first information on virtual asset to be transmitted from a first user to a second user from a first virtual asset service provider (VASP) server managing virtual asset of the first user, determining whether a transaction corresponding to transmission of the virtual asset to be transmitted is recorded in a blockchain, reserving verification of a second user when it is determined that the transaction is recorded in the blockchain and a second VASP server managing virtual asset of the second user is a non-member, proceeding the reserved verification of a second user and transmitting a verification request as to whether information on the second user included in the first information is correct to the second VASP server when the second VASP server joins as a member, and transmitting a virtual asset update request of the second user to the second VASP server when a verification result indicating that the information on the second user is correct is received from the second VASP server as a response to the verification request.

According to another embodiment, a method for mediating virtual asset transmission may comprise receiving information on virtual asset to be transmitted from a first user to a second user, transmitting a verification request as to whether information on the second user is correct to a second VASP server managing virtual asset of the second user through a verification node, and recording a transaction corresponding to transmission of the virtual asset to be transmitted in a blockchain when a verification result indicating that the information on the second user is correct is received from the verification node.

According to another embodiment, a method for mediating virtual asset transmission may comprise providing a public key to a virtual asset service provider server managing virtual asset of a first user through a verification node when virtual asset is scheduled to be transmitted from a first user to a second user, receiving information on the second user encrypted with the public key by a virtual asset service provider server from the verification node, verifying whether the information on the second user is correct by decrypting the received encrypted information on the second user using a private key, and transmitting the verification result to the verification node, and when receiving a virtual asset update allowing signal as a response, updating virtual asset of the second user by reflecting a quantity of the virtual asset transmitted.

DETAILED DESCRIPTION

Figures 1, 2:
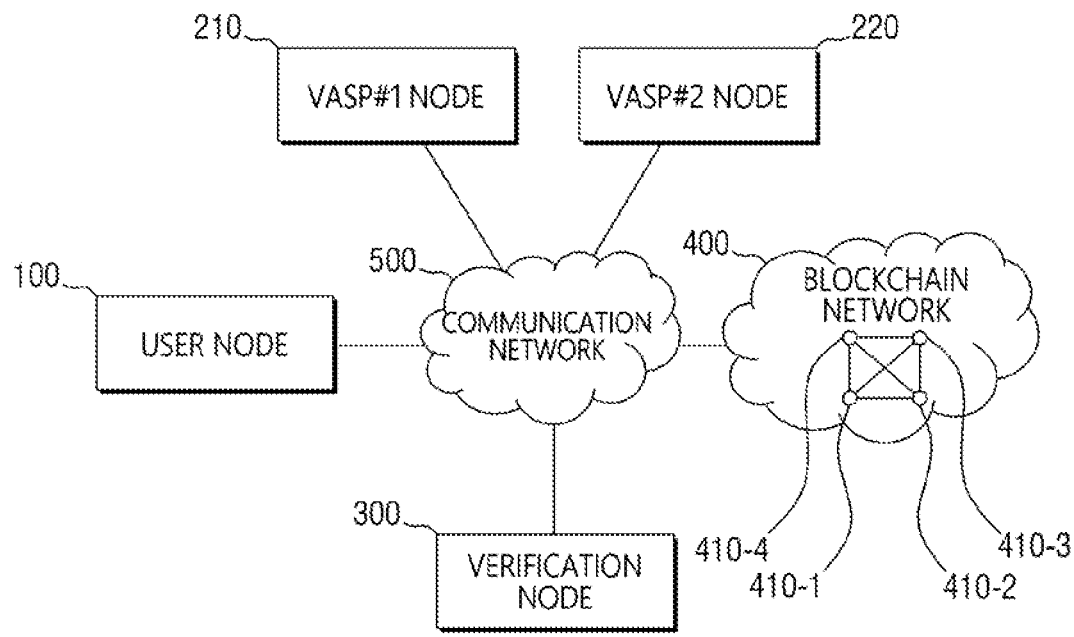
FIG. 1 is a diagram illustrating a virtual asset mediation system according to an embodiment of the present disclosure.
FIG. 2 is a diagram illustrating a public key for each security level referenced in some embodiments of the present disclosure and an application target thereof.

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments may be provided so that this disclosure will be thorough and complete and will fully convey the concept of the disclosure to those skilled in the art, and the present disclosure will be defined by the appended claims.

In adding reference numerals to the components of each drawing, it should be noted that the same reference numerals may be assigned to the same components as much as possible even though they may be shown in different drawings. In addition, in describing the present disclosure, based on it being determined that the detailed description of the related well-known configuration or function may obscure the gist of the present disclosure, the detailed description thereof will be omitted.

Unless otherwise defined, all terms used in the present disclosure (including technical and scientific terms) may be used in a sense that can be commonly understood by those skilled in the art. In addition, the terms defined in the commonly used dictionaries may not be ideally or excessively interpreted unless they are specifically defined clearly. The terminology used herein may be for the purpose of describing embodiments and may not be intended to be limiting of the disclosure. In this specification, the singular also includes the plural unless specifically stated otherwise in the phrase.

In addition, in describing the component of this disclosure, terms, such as first, second, A, B, (a), (b), can be used. These terms may be for distinguishing the components from other components, and the nature or order of the components may not be limited by the terms. Based on a component being described as being "connected," "coupled" or "contacted" to another component, that component may be directly connected to or contacted with that other component, but it should be understood that another component also may be "connected," "coupled" or "contacted" between each component.

Requirement of Travel Rule

According to the Travel Rule at the time of virtual asset transfer, a virtual asset service provider (hereinafter referred to as "VASP") that transmits a virtual asset is requested to provide the following information to the VASP receiving the virtual asset.

Originator name

Originator's account number (Sender's account number)

Originator's physical address (Sender's physical address)

Nationality identity number, customer identification number, or other unique identification number Date of birth and place of birth In addition, according to the above information provision obligation, the VASP receiving the virtual asset is required to provide the following information to the VASP transmitting the virtual asset.

Beneficiary name

Account number of virtual wallet of the Beneficiary (recipient)

Anonymous Recipient Under Travel Rule

However, as the use of virtual assets is rapidly increasing, virtual assets are being distributed around the world, and virtual assets are being used for money laundering by taking advantage of the anonymity of virtual assets. In addition, when transmitting a virtual asset, even if verification of the transaction for the transmission succeeds, the recipient may remain anonymous. As in the above-mentioned information provision obligation, since only the name of the recipient and the account number of the virtual wallet are required, the recipient can still remain anonymous in the transaction history.

Direct Communication Between VASPs Under Travel Rule

Under the travel rule, it is allowed for two VASPs (sender and recipient) may communicate directly with each other for a virtual asset transfer. However, for such direct communication, each VASP needs to maintain a system that complies to various communication protocols of various counterpart VASPs and needs to keep information (e.g. server address) of counterpart VASPs current, which is challenging and burdensome for individual VASPs.

Communication Via Communication Mediation System

In embodiments, a VASP may communicate with a counterpart VASP via a communication mediation system (verification node 300) rather than communicating directly with counterpart VASP. The communication mediation system may keep information of the counterpart VASP current, maintain a communication channel with the counterpart VASP, verify messages to and from the counterpart VASP. Using the communication mediation system, an individual VASP can communicate with counterpart VASPs without exerting undesirable effort to maintain a separate communication channel for each counterpart VASP.

Communication Mediation System Exclusive to Member VASPs

In embodiments, two VASPs may communicate via the communication mediation system only when each of the two VASPs has a membership to use communication mediation system. In embodiments, the communication mediation system may hold (or reject) a virtual asset transfer request from its member VASP until the counterpart VASP becomes a member.

Communication Hub of VASPs

In embodiments, two member VASPs may not have a communication channel separate from the communication mediation such that every communication for a virtual asset transfer may be made via the communication mediation system. The communication mediation system may act as a communication hub of VASPs.

Predetermined Communication API with Member VASP

For each member VASP, the communication mediation system may establish a predetermined communication API. The communication mediation system may use a customized API for an individual VASP to accommodate requirements of the VASP.

Designated Server to Communicate with Communication Mediation System

A VASP may setup a designated server (enclave server) for communication with the communication mediation system. The designated server maintains application programming interface (API) to provide information required by the Travel Rule to the communication mediation system.

Anti Money Laundering Solution

The core of the information provision obligation may be information sharing. However, due to the relatively lack of regulation in the virtual asset industry, many VASPs are required to develop an AML (Anti Money Laundering) solution to identify users' ownership information.

Accordingly, FATF (Financial Action Task Force on Money Laundering) recommended the following characteristics that an information provision solution should have.

Solutions should be able to easily integrate with existing AML/CFT programs with minimal regulatory impact and adoption barriers.

It should be affordable and open source for access by small VASPs and innovative startups.

It should comply with global regulatory standards for virtual asset transfer.

It should be flexible to accommodate future innovations and advances in technology.

It should proactively detect suspicious activity and complement the efforts of law enforcement agencies to prosecute money launderers and terrorists.

It should be scalable, maintainable, and has broad support from industry.

Embodiments that can accommodate the characteristics of the solution proposed by the FATF are proposed. Hereinafter, some embodiments will be described in detail with reference to the accompanying drawings. Within this disclosure, an originator may be referred to as a "sender" and a beneficiary may be referred to as a "recipient."

Virtual Asset Mediation System

FIG. 1 is a diagram illustrating a virtual asset mediation system according to an embodiment of the present disclosure.

As shown in FIG. 1, the virtual asset mediation system according to an embodiment described herein may comprise a user node 100, a plurality of VASP nodes 210, 220, a verification node 300 and a blockchain network 400. These components may communicate with each other through the communication network 500. Since the communication network 500 includes a mobile communication network and a wired communication network and corresponds to a well-known conventional technology, a detailed description thereof will be omitted.

User Node

The user node 100 is a communication device, such as a mobile terminal, a personal computer, etc. possessed by the user, and may transmit the virtual asset to the recipient by connecting to any one VASP node 210 or 220 that manages its own virtual asset. Such a user node 100 may be equipped with a dedicated application for virtual asset management.

Blockchain Network

The blockchain network 400 is a network, in which a plurality of nodes 410-N participate, and each node 410-N included in the blockchain network 400 may share a blockchain having blocks connected to each other. The block may be composed of a block header and a transaction. The block header may include a previous block hash, a merkle root, a nonce, and a timestamp. The previous block second identifier may indicate a second identifier reference value for a previous block (i.e., a parent block) in the master block chain structure. The merkle root may be a second identifier (e.g., hash) for the merkle tree root. The timestamp may record the creation time of the block. Transaction information of virtual assets may be recorded in the transaction. That is, the transaction may include transaction information such as the electronic wallet address of the sender of the virtual asset, the recipient's electronic wallet address, the virtual asset type, and the quantity of virtual assets transmitted to the recipient.

VASP Node

The VASP nodes 210 and 220 may manage a subscriber's virtual asset transaction. It may be a computing device such as a server (i.e., a VASP server) built by a service provider that manages virtual assets. The VASP nodes 210 and 220 may store and manage subscriber information in order to perform a virtual asset transaction service. The subscriber information may include a name, account number, physical address, user identification information, date of birth and place of birth. As the user's identification information, authorized identification information granted only to the corresponding user, such as a user's nationality identity number (e.g., Korean resident registration number) used in a corresponding country, and a customer identification number, may be used. In addition, the VASP nodes 210 and 220 may store the electronic wallet address of each subscriber, the quantity of virtual assets, and transaction details of virtual assets (e.g., deposit and withdrawal details).

Security Level of VASP Node

The VASP nodes 210 and 220 may apply different security levels to the transmission of virtual assets and transmit the personal data encrypted according to the security level to the counterpart's VASP nodes 210 and 220. The security level may be divided into three types. In some embodiments, any one of a plurality of security levels may be selected and applied to a corresponding transmission according to a quantity of virtual assets to be transmitted. In this case, the first security level may be the highest level applied when the quantity of virtual assets to be transmitted exceeds the first quantity, the second security level may be an intermediate level applied when the quantity of virtual assets is less than or equal to the first quantity and exceeds the second quantity, and the third security level may be the lowest level applied when the quantity of virtual assets is less than or equal to the second quantity. Here, the first quantity is greater than the second quantity.

In some embodiments, a security policy may be prepared in advance, and any one of a plurality of security levels may be selected and applied to the transmission of the corresponding virtual asset according to the currently applied security policy. For example, the security policy may be set by an administrator, or may be automatically generated based on a time zone, date, frequency of hacking accidents, and the like.

Public Key for Security Level

FIG. 2 is a diagram illustrating a public key for each security level referenced in some embodiments of the present disclosure and an application target thereof.

Referring to FIG. 2, when the first security level is applied, a public key applied to each transaction (i.e., transmission of a virtual asset) may be generated, and a private key corresponding to the corresponding public key may also be generated. In addition, when the second security level is applied, a public key applied to a counterpart user (i.e., a sender or a recipient) and the corresponding private key may be used. When the third security level is applied, the public key applied to the counterpart VASP node (i.e., the recipient VASP node or the sender VASP node) and the corresponding private key may be used.

The first security level may be the strongest, but the application range may be the narrowest. In other words, even if the private key applied to the first security level is leaked, only personal data related to one transaction can be decrypted with the corresponding private key, so it may be impossible to decrypt personal data related to another transaction. Conversely, the third security level may be the weakest among the security levels, but may have the widest application range. In other words, when the private key applied to the third security level is leaked, personal data transmitted and received between the sender VASP node and the recipient VASP node with the corresponding private key may be leaked.

Based on this security level, the VSAP nodes 210 and 220 may obtain a public key applied to a specific security level from among a plurality of public keys, and encrypt personal data including recipient information and sender information with the obtained public key. That is, when the first security level is applied, the VASP nodes 210 and 220 may generate a private key and public key dedicated to a transaction that are used only for the corresponding transaction (i.e., the corresponding transmission), and encrypt or decrypt personal data including the recipient information and the sender information using the corresponding private or public key. The private key and public key generated according to the first security level may be a kind of one-time encryption key and decryption key that cannot be reused for other transactions. When the second security level is applied, the VASP nodes 210 and 220 may generate a private key and a public key dedicated to the recipient (or sender) that are used only for a specific recipient or sender, and encrypt or decrypt personal data including the recipient information and the sender information using the corresponding private or public key. The private key and public key generated according to the second security level may be reused when a transaction with the same recipient (or sender) occurs again. When the third security level is applied, the VASP nodes 210 and 220 may generate a private and public key dedicated to the VASP node that manages the assets of the recipient (or sender), and encrypt or decrypt personal data including the recipient information and the sender information using the corresponding private or public key. The private key and public key generated according to the third security level may be reused when a transaction related to the corresponding VASP occurs again.

Verification Node

The verification node 300 may mediate the transmission of virtual assets between the VASP nodes 210 and 220, verify the transmission of virtual assets, and store the transaction verification result. To this end, the verification node 300 may store VASP member information including each VASP name joined as a member and identification code, IP address, institution address, nationality, and institution identification information (e.g., business registration number) registered in the country. The verification node 300 allocates an identification code of each VASP node 210, 220, which has joined as a member, and provides it to the corresponding VASP nodes 210 and 220, and then may record the identification code in VASP member information. The identification code is unique information given to the VASP nodes 210 and 220, and may be a numeric string or a character string, and may be a combination of numbers and characters. In some embodiments, the verification node 300 may store a security policy based on one or more of hacking frequency, time, date, and the like. The verification node 300 may determine a security level based on the security policy, and obtain a public key applied to the determined security level from the VASP 210 and 220.

The verification node 300 obtains the transaction to be verified from the blockchain network 400, and may verify the transaction for the virtual asset transaction by comparing information included in the obtained transaction with the information included in the transaction received from the VASP nodes 210 and 220. Also, the verification node 300 may provide the public key received from the specific VASP node to other VASP node.

The verification node 300 may store verification information including the first identifier, the identification code of the VASP node that sent the virtual asset, the identification code of the VASP node that received the virtual asset, the verification result of the sender, the verification result of the recipient, the transaction verification result, the public key of the sender VASP and the public key of the recipient VASP. The public key of the sender VASP is a kind of encryption key used to encrypt personal data, and may be generated in a VASP node that manages the sender's virtual assets. In addition, the public key of the recipient VASP is a key used to encrypt personal data, and may be generated in a VASP node that manages the recipient's virtual assets. Meanwhile, the verification information may include encrypted personal data, and may further include a transaction stored in the blockchain network 400.

Verification Node Participating Blockchain Network

FIG. 1 shows that the verification node 300 and the VASP nodes 210 and 220 are separated from the blockchain network 400, but at least one of the verification node 300 or the VASP nodes 210 and 220 is may be a node participating in the blockchain network 400. In this case, the verification node 300 or the VASP nodes 210 and 220 may share and store the blockchain.

Verification Node Independent From VASPs

In embodiments, the verification node 300 may not belong to a VASP, and may operate independently from the he VASP nodes 210 and 220. The verification node 300 may be run by an entity independent from VASPs.

Mediating Virtual Asset Transmission

In the virtual asset mediation system including the verification node 300 and the VASP nodes 210 and 220, a method for mediating virtual asset transmission will be described with reference to FIGS. 3 to 9.

In the description with reference to FIGS. 3 to 9, it is assumed that the VASP #1 node 210 is the sender VASP node that manages the sender's (i.e., user's) virtual asset and sends the virtual asset on behalf of the sender, and the VASP #2 node 220 is the recipient VASP node that manages the recipient's virtual assets and receives virtual assets on behalf of the recipient.

Obtaining Identification Code of VASP

Figure 3:
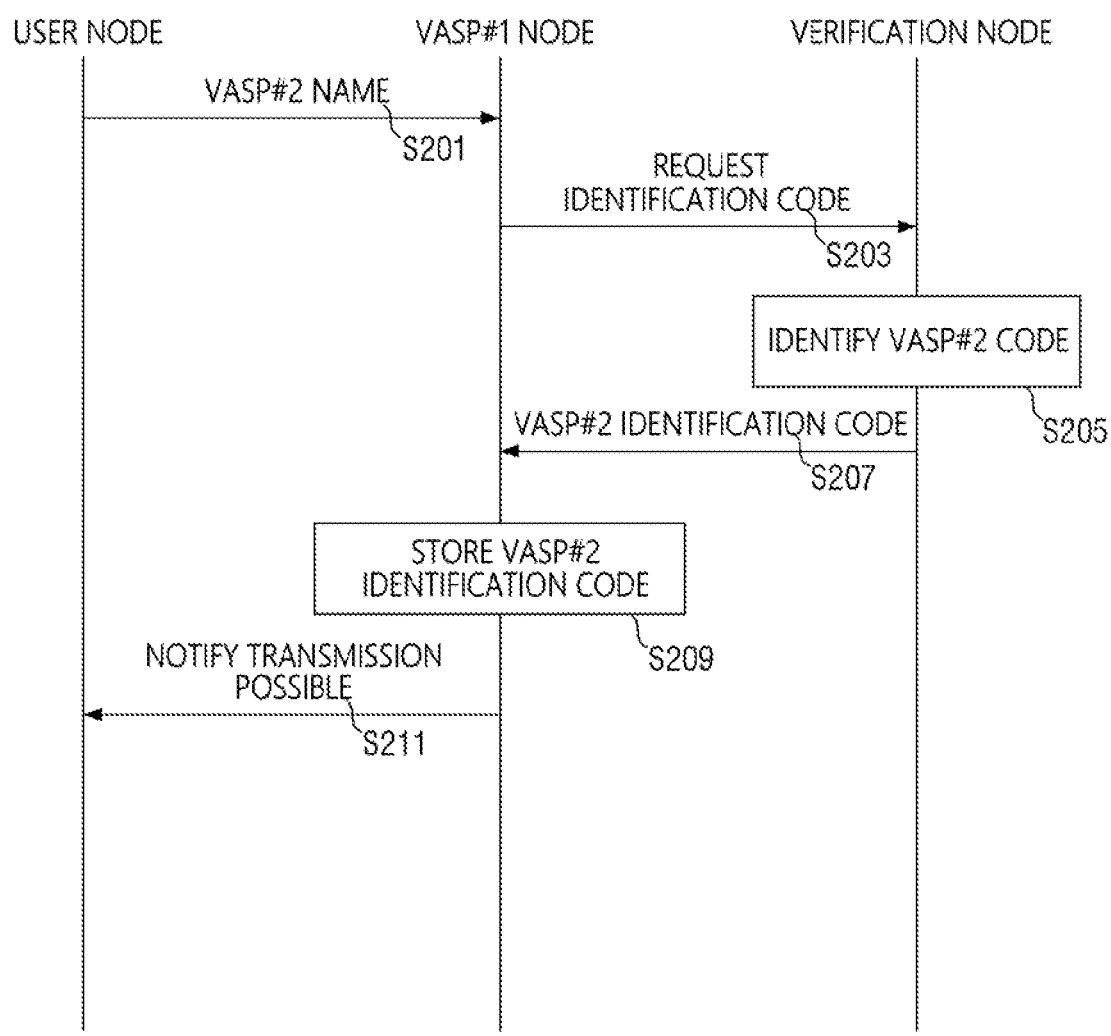
FIG. 3 is a signal flow diagram for obtaining a VASP identification code according to another embodiment of the present disclosure.

FIG. 3 is a signal flow diagram for obtaining a VASP identification code according to another embodiment of the present disclosure.

Transmitting Inputted Name of Recipient VASP (S201)

Referring to FIG. 3, after the user node 100 connects to the VASP #1 node 210 and succeeds in user authentication (e.g., login authentication or digital signature authentication), the name of VASP #2 the node 220 that manages the assets of the recipient may be input from the user. That is, in order to transmit his/her virtual asset to the recipient, the user logs in to the VASP #1 node 210 using the user node 100, and then may input the name of VASP #2 node 220 that manages the recipient's virtual asset into the user node 100. In this case, the user node 100 may transmit the name of the VASP #2 node 220 to the VASP #1 node 210 (S201).

Identification Code Request to Verification Node (S203)

Subsequently, the VASP #1 node 210 may determine whether the identification code of the VASP #2 node 220 mapped to the name of the VASP #2 node 220 are already stored. The VASP #1 node 210 may transmit an identification code request message including the name of the VASP #2 node 220 to the verification node 300 if the identification code of the VASP #2 node 220 is not stored (S203).

Verification Node's Response When Recipient's VASP is a Member (S205, S207)

The verification node 300 may determine whether a member having the name of the VASP #2 node 220 exists in the VASP member information, and if it exists, identify the identification code of the VASP #2 node 220 in the VASP member information and transmit it to the VASP #1 node 210 (S205, S207).

Storing Identification Code of Recipient's VASP

Subsequently, the VASP #1 node 210 may map and store the name of the VASP #2 node 220 with the identification code of the VASP #2 node 220 received from the verification node 300 (S209). In addition, the VASP #1 node 210 may transmit a transmission possible message indicating that the transmission to the VASP #2 node 220 can proceed to the user node 100 (S211).

No Identification Code Request to Verification Node for a Pre-Stored VASP

On the other hand, if the VASP #1 node 210 already stores the identification code of the VASP #2 node 220 mapped to the name of the VASP #2 node 220, the VASP #1 node 210 may directly transmit the transmission possible message to the user node 100 without transmitting an identification code request message to the verification node 300.

Verification Node's Response when Recipient's VASP is not a Member

In step S205, it is determined that a member having the name of the VASP #2 node 220 does not exist in the VASP member information, the verification node 300 may transmit a message indicating that the identification code cannot be provided (e.g., return 0) to the VASP #1 node 210. In this case, the VASP #1 node 210 may transmit a message indicating that the virtual asset transmission to the VASP #2 node 200 is impossible to the user node 100.

Preventing Asset Transmission to Non-Member VASP

According to this embodiment, the effect of preventing illegal use of virtual assets can be exerted by verification node 300 obtaining and managing information of each authenticated VASP 210 and 220, and preventing the transmission of virtual assets to VASPs that are not registered as members.

On the other hand, when the identification code of the VASP #2 node 220 is obtained and the transmission possible notification message is received, the user node 100 may transmit the user's (i.e., the sender's) virtual asset to the recipient based on the information input from the user.

Verifying Recipient of Virtual Asset

Figure 4:
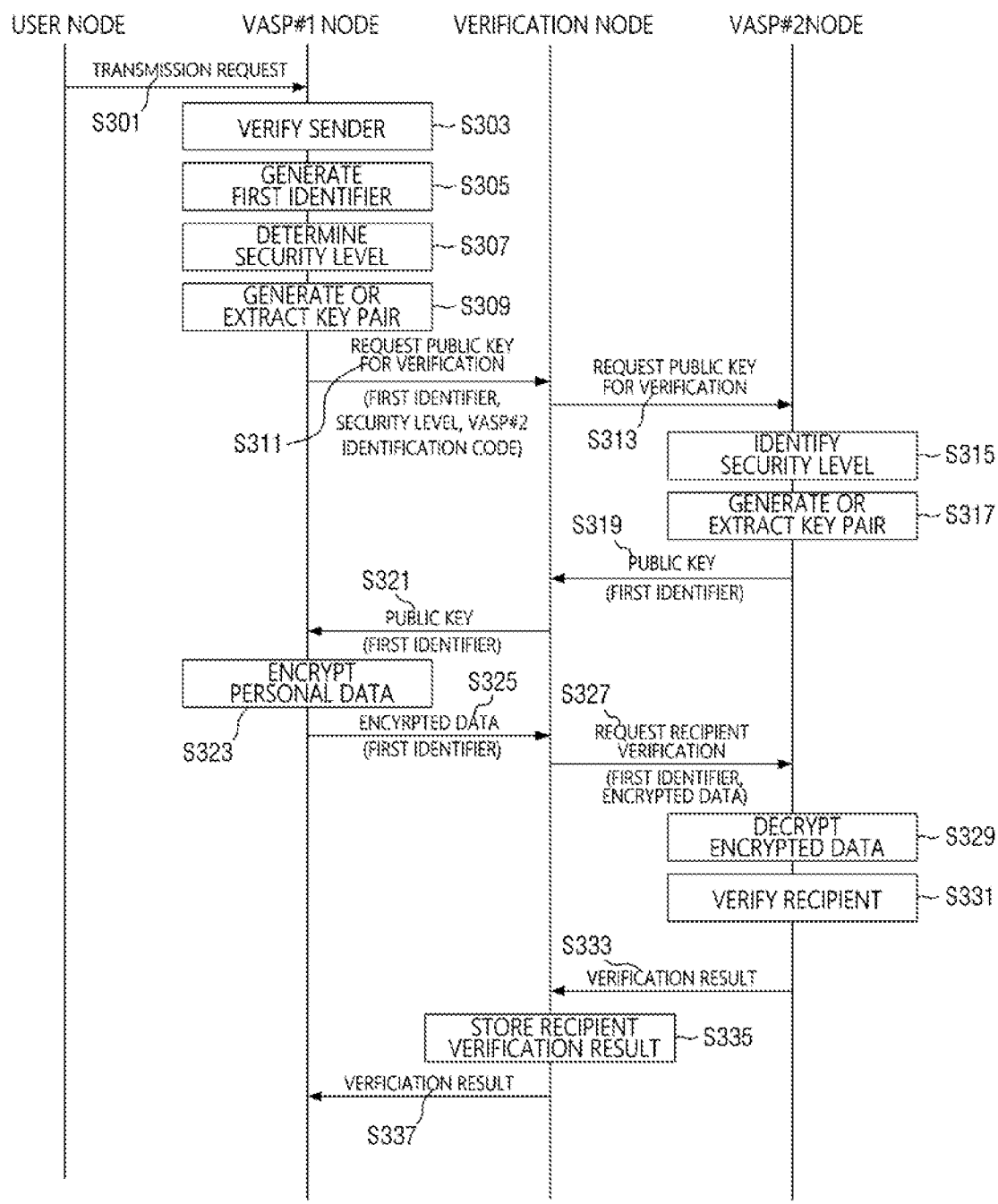
FIG. 4 is a signal flow diagram illustrating a method of verifying a recipient of a virtual asset according to another embodiment of the present disclosure.

FIG. 4 is a signal flow diagram illustrating a method for verifying a recipient of a virtual asset according to another embodiment of the present disclosure. Referring to FIG. 4, the user node 100 may receive the types of virtual assets to be transmitted, the quantity of virtual assets to be transmitted and the recipient's electronic wallet address, etc. from the user (i.e., the sender), and transmit a transmission request message including the address of the sender, the type of virtual asset, the quantity of virtual assets to be transmitted, and the recipient's electronic wallet address to the VASP #1 node 210 (S301).

Verification of Sender (S303)

Then, the VASP #1 node 210 may perform sender verification (S303). The VASP #1 node 210 may perform verification of the sender using the sender's (i.e., user's) electronic wallet address and sender's authentication information. At this time, the VASP #1 node 210 may verify the sender by obtaining the sender's name as the sender's authentication information, and determining whether subscriber information having the sender's name and the sender's address is stored. As another embodiment, the VASP #1 node 210 may verify the sender by receiving the sender's biometric information (e.g., fingerprint data, iris data, etc.) from the user node 100, and comparing the received the sender's biometric information and the pre-stored sender's biometric information. The sender (i.e., user) may be verified using various other authentication methods. On the other hand, if the login authentication of the user (sender) is already succeeded before step S303, the VASP #1 node 210 may process the verification result of the sender as a success.

Generating Identifier for Transaction (S305)

If the verification is successful, the VASP #1 node 210 may generate a first identifier (S305), and may map and store the first identifier and the verification result of the sender. The first identifier may be a verification ID used to identify verification information of the virtual asset. The first identifier may be generated using a current date and time, a random number, or the like. The VASP nodes 210 and 220 may inquire the verification information stored in the verification node 300 using the first identifier.

Determining Security Level (S307)

Next, the VASP #1 node 210 may determine a security level applied to the transmission of the virtual asset from among a plurality of security levels (S307). At this time, the VSAP #1 node 210 may identify the quantity of virtual assets included in the transmission request message, determine to which security level the quantity of virtual assets belongs among security levels, and determine the security level applied to the transmission. Then, the VASP #1 node 210 may generate a new key pair (i.e., a private key and a public key) or extract an already generated key pair according to the determined security level, and map and store the key pair and the first identifier (S309).

Different Security Level Based on Transaction Amount

When the security level is determined according to the quantity of virtual assets, the VASP #1 node 210 may apply the first security level when the quantity of the virtual assets exceeds the first quantity, apply the second security level when the quantity of the virtual assets is less than or equal to the first quantity and exceeds the second quantity, and apply the third security level when the quantity of the virtual assets is equal to or less than the second quantity. When it is determined to apply the first security level, the VASP #1 node 210 may generate a private key and a public key dedicated to a transaction that are applied only to the transmission of the virtual asset. In addition, when it is determined to apply the second security level, the VASP #1 node 210 may identify the recipient based on the recipient's electronic wallet address, and determine whether a key pair dedicated to the recipient that is used only for the recipient has already been generated. The VASP #1 node 210 may generate a private key and a public key dedicated to the recipient if the key pair dedicated to the recipient is not generated. On the other hand, when it is determined to apply the third security level, the VASP #1 node 210 may extract a key pair dedicated to the VASP #2 node 220 that is used only for the VASP #2 node 220 that manages the virtual asset of the recipient. If a key pair dedicated to the VASP #2 node 220 is not generated, the VASP #1 node 210 may generate a key pair dedicated to the VASP #2 node 220.

Request of Public Key to Verification Node (S311)

Next, the VASP #1 node 210 may transmit a message (hereinafter, referred to as a "public key request message") for requesting the public key of the recipient-side for verification of the recipient to the verification node 300 (S311). At this time, the VASP #1 node 210 may transmit the public key request message including the first identifier, the verification result of the sender, the applied security level, and the identification code of the VASP #2 node 220 that manages the recipient's virtual asset to the verification node 300. In addition, if the security level is the second level, the VASP #1 node 210 may additionally include the sender's identification information (e.g., the sender's electronic wallet identification information) in the public key request message, and transmit the public key generated or extracted according to the security level (i.e., the public key of the VASP #1 node) to the verification node 300.

Public Key Request to Recipient's VASP

Then, the verification node 300 may identify the first identifier, the sender verification result, the identification code of the VASP #2 node 220 and the public key of the VASP #1 node 210 included in the public key request message, in addition, identify the identification code of the VASP #1 node 210 that has sent the public key request message. Then, the verification node 300 includes the identification code of the VASP #1 node 210 as the identification code of the sender-side VASP, and includes the identification code of the VASP #2 node 220 as the identification code of the recipient-side VASP. In addition, it may generate and store verification information including the first identifier, the verification result of the sender, and the public key of the VASP #1 node 210. Subsequently, the verification node 300 may transmit the public key request message to the VASP #2 node 220 (S313).

Public Key Generation in Response to Public Key Request (S315, S317)

When the VASP #2 node 220 receives the public key request message, the VASP #2 node 220 may identify the security level included in the public key request message (S315). Next, the VASP #2 node 220 may generate a new key pair (i.e., a private key and a public key) or extract an already generated key pair according to the identified security level (S317). When the security level is the first security level, the VASP #2 node 220 may generate a private key and a public key dedicated to the transaction that are applied only to the transmission. In addition, when the security level is the second security level, the VASP #2 node 220 may identify the sender's identification information (e.g., the sender's electronic wallet address) in the public key request message, and determine whether a key pair dedicated to the sender that is used only for the sender has already been generated, and if it exists, extract the public key dedicated to the sender. If the key pair is dedicated to the sender is not generated, the VASP #2 node 220 may generate and store the private key and public key dedicated to the sender. On the other hand, when the security level is the third security level, the VASP #2 node 220 may determine whether a key pair dedicated to the VASP #1 node 210 that is used only for the VASP #1 node 210 has already been generated, and if it exists, extract the public key dedicated to the VASP #1 node 210. The VASP #2 node 220 may generate and store a private key and a public key dedicated to the VASP #1 if a key pair dedicated to the VASP #1 node 210 is not generated.

Storing Public Key in Association with Transaction Identifier

The VASP #2 node 220 may map and store the first identifier and the corresponding key pair, and transmit the extracted or generated public key together with the first identifier to the verification node 300 (S319). Then, the verification node 300 may transfer the received public key and the first identifier to the VASP #1 node 210 (S321), and store the public key received from the VASP #1 node 210 in the verification information having the first identifier.

Verification Node Determining Security Level

In some embodiments, the verification node 300 may determine a security level based on a security policy or a quantity of virtual assets to be transmitted. In this case, the verification node 300 may transmit the determined security level to the VASP #1 node 210 and the VASP #2 node 220 such that the public key and private key used in the security level in each of the VASP #1 node 210 and the VASP #2 node 220 are obtained, and receive the public key of the VASP #2 node 220 and provide it to the VASP #1 node 210. In some embodiments, the verification node 300 may determine the security level based on the quantity of virtual assets to be transmitted or the security policy. In this case, the verification node 300 may transmit the determined security level to each of the VASP #1 node 210 and the VASP #2 node 220 such that the public key and private key used in the security level in each of the VASP #1 node 210 and the VASP #2 node 220 are obtained, and obtain the public key obtained from the VASP #2 node 220 and transmit it to the VASP #1 node 210.

Encrypt Data for Asset Transaction (S323)

Next, the VASP #1 node 210 may identify the private key mapped to the first identifier (i.e., the private key extracted or generated in step S309). And, the VASP #1 node 210 may encrypt personal data including recipient information and sender information using the private key to generate first encrypted data, and encrypt the user personal data using the public key received from the verification node 300 to generate the second encrypted data (S323). The sender information may include a sender's name, account number, physical address, identification information of the sender registered in the country, and the date and place of birth of the sender. The VASP #1 node 210 may obtain and store the sender information in advance when the sender joins as a member. Also, the recipient information may include a recipient name and an account number of the recipient (e.g., an address of an electronic wallet). The first encrypted data may be data that can be normally decrypted and used in the VASP #1 node 210 corresponding to the sender-side, and the second encrypted data may be a data that can be normally decrypted and used in the VASP #2 node 220 corresponding to the recipient-side.

Transmitting Encrypted Data to Verification Node (S323)

Next, the VASP #1 node 210 may transmit information about the virtual asset to be transmitted to the recipient to the verification node 300 (S325). In some embodiments, the VASP #1 node 210 may transmit the first encrypted data, the encrypted second encrypted data, and the first identifier as information on the virtual asset to the verification node 300.

Relaying Encrypted Data to Recipient's VASP

Subsequently, the verification node 300 may include the first encrypted data and the encrypted second encrypted data in the verification information including the first identifier. Next, the verification node 300 may request verification of the recipient by transferring the second encrypted data and the first identifier to the VASP #2 node 220 (S327).

Processing Encrypted Data at Recipient's VASP to Verify Recipient Information

Next, the VASP #2 node 220 may identify the private key mapped to the first identifier (that is, the private key extracted or generated in step S317), and decrypt the second encrypted data using the private key to obtain the personal data (S329). Next, the VASP #2 node 220 may verify the recipient by identifying recipient information in the personal data and determining whether the subscriber information managed by the VASP #2 node 220 matches the recipient information (S331). At this time, the VASP #2 node 220 may identify the address (e.g., electronic wallet address) and name of the recipient in the recipient information, and if subscriber information having both the recipient address and the name is already stored, process the recipient verification as a success, otherwise process it as a verification fail. The VASP #2 node 220 may transmit the verification result of the recipient and the first identifier to the verification node 300 (S333).

Actions Subsequent to Recipient Information Verification

Then, the verification node 300 may additionally include the verification result of the recipient in the verification information having the first identifier, store the verification result of the recipient (S335), and also transfer the verification result of the recipient to the VASP #1 node 210 (S337). When the verification result of the recipient is determined to be a failure, the VASP #1 node 210 may transmit a message to the user node 100 notifying that the virtual asset transmission cannot proceed due to the failure of the authentication of the recipient. On the other hand, when the verification result of the recipient is determined to be successful, the VASP #1 node 210 may proceed with a procedure for transmitting the virtual asset according to the method shown in FIG. 5.

Advantage—Enhanced Security

According to the present embodiment, since the recipient information is encrypted using the public key used in the applied security level and transmitted to the VASP #2 node 220, the effect of enhancing the security of the recipient information can be obtained. In addition, according to the present embodiment, it is possible to obtain the effect of closely verifying the information of the recipient when remitting virtual assets.

Processing of Transaction Data

Figure 5:
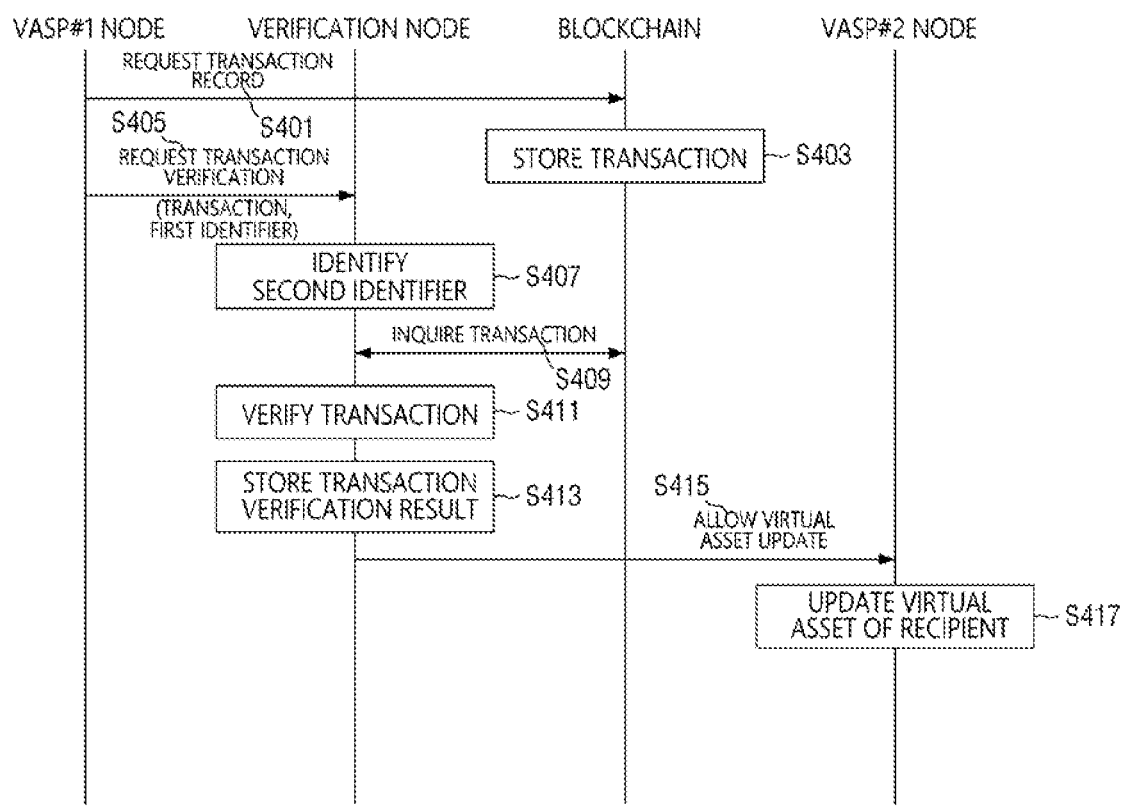
FIG. 5 is a signal flow diagram for describing a method for mediating virtual asset transmission according to another embodiment of the present disclosure.

FIG. 5 is a signal flow diagram for describing a method for mediating virtual asset transmission according to another embodiment of the present disclosure.

Recording Transaction Data on Blockchain

Referring to FIG. 5, if the verification result of the recipient is successful, the VASP #1 node 210 may prepare transaction data including a second identifier and transmission related information of a virtual asset as a response to the verification success, and transmit a transaction record request message including the transaction data to the blockchain network 400 (S401). That is, if the verification result of the recipient is successful, the VASP #1 node 210 may transmit the transaction record request message to the blockchain network 400 as a response thereto so that the transaction corresponding to the transmission of the virtual asset scheduled to be transmitted to the recipient is recorded in the blockchain. The second identifier may be a hash of a transaction related to the transmission, and the transmission related information may include one or more items among a sender's address (e.g., an electronic wallet address), a recipient's electronic wallet address, a virtual asset type, and the quantity of a virtual asset to be transmitted.

Mining (Storing Transaction on Blockchain)

Next, each node 410-N of the blockchain network 400 performs mining and connects a new block including the second identifier and transaction data to the existing block, thereby storing a transaction for the transmission of the virtual asset in the blockchain (S403).

Obtaining Second Identifier Representing Blockchain Record

In embodiments, the VASP #1 node 210 may generate or obtain a identifier that uniquely representing the transaction stored at S403 (blockchain record) on the blockchain network. The VASP #1 node 210 may generate or obtains the Transaction Hash (Txhash) of the blockchain record (the transaction stored at S403) as the second identifier. For example, the blockchain network may return a Transaction Hash in response to the transaction recordation request (S401, S501) from the VASP #1 node 210.

Transaction Verification Request to Verification Node (S405)

When mining is stabilized, the VASP #1 node 210 may transmit a transaction verification request message including the transaction data and the first identifier to the verification node 300 (S405). The stabilization of the mining may be that transactions are normally stored in the blockchain. In embodiments, the VASP #1 node 210 include the second identifier (for example, Txhash of the blockchain record) in the transaction verification request such that the verification node 300 may determine that the intended transaction from has been recorded on the blockchain network when a blockchain record corresponding to the second identifier is confirmed.

Transaction Related Information

In embodiments, the transaction related information may include one or more of sender's name, sender's account number, sender's physical address, sender's nationality identity number, sender's identification (customer number or any other sender's unique identification), sender's date of birth, sender's place of birth, recipient's name, recipient's name, recipient's account number, recipient's physical address, recipient's nationality identity number, recipient's identification (customer number or any other sender's unique identification), recipient's date of birth, identification (name, type) of virtual asset, amount (quantity) of the virtual asset. The transaction related information may be recorded on the blockchain network 400 (S403), and may be transmitted to the verification node 300 such that the verification node 300 confirms a blockchain transaction record based on at least part of the transaction related information.

Verification of Blockchain Record Based Using Transaction HashSubsequently, the verification node 300 may store the transaction data in verification information having the first identifier. In addition, the verification node 300 may identify a second identifier from the transaction data included in the transaction verification request message as the transaction verification request message is received, and inquire whether a transaction corresponding to the second identifier is found in the blockchain network 400, thereby determining whether a transaction related to the transmission of the virtual asset is recorded in the blockchain (S407, S409).

At this time, the verification node 300 may obtain a third identifier (e.g., a hash) for each of at least one or more transactions among the transactions recorded in the blockchain, and check whether the obtained third identifier corresponds to the second identifier, and find a transaction corresponding to the second identifier using the result of the check.

Verification of Blockchain Record without Transaction Verification Request Message In some embodiments, the verification node 300 may determine whether the transaction related to the transmission of the virtual asset is recorded in the blockchain without receiving the transaction verification request message. That is, when the VASP #1 node 210 responds to the transmission of the verification result (that is, the recipient verification is successful) by recording the transaction corresponding to the transmission of the virtual asset scheduled to be transmitted in the blockchain, the verification node 300 may determine whether a transaction related to the transmission of the virtual asset scheduled to be transmitted is recorded in the blockchain as a result of the response. In embodiment, the VASP #1 node 210 may notify that it sent a request for transaction recordation (S401, S501) even when the notification may not trigger verification of the blockchain record.

Initiating Verification of Blockchain Record Based on Time Elapsed

In some embodiments, the verification node 300 may initiate verifying the blockchain record without waiting for a request from the VASP #1 node 210. For example, the verification node 300 initiate verification of the blockchain record when a predetermined time has been elapsed from receiving of the public key request (S311), returning public key to VASP #1 node 210 (S321), receiving of the encrypted personal data (S325) or returning recipient verification result (S337). The verification node 300 initiate verification of the blockchain record based on time after one or more communications with the VASP #1 node 210, VASP #2 node 220 and the blockchain network.

Example Process to Verify Blockchain Record

When it is determined that the transaction corresponding to the second identifier is recorded in the blockchain, the verification node 300 may extract transmission related information from the transaction corresponding to the second identifier. Next, the verification node 300 may identify one or more specific first items from the transmission related information included in the transaction data received from the VASP #1 node 210 in step S405, and identify one or more specific second items in the transmission related information extracted from the transaction of the blockchain, and then determine whether the first item and the second item correspond to each other, thereby verifying whether the transaction corresponding to the transmission of the virtual asset is recorded in the blockchain (S411). The verification node 300 may determine that the transaction verification is successful if the first item and the second item correspond to each other, and may determine that the transaction verification is a fail if the first item and the second item do not correspond to each other. The specified item may be one or more items preset in the transmission related information. For example, the specified item may be at least one of the quantity of virtual assets, the sender's address, and the recipient's electronic wallet address. When the first item and the second item match or the first item and the second item are mapped and recorded in the verification information, the verification node 300 may determine that the first item and the second item correspond to each other.

Sending Account Update Request to Recipient's VASP

By additionally including the verification result of the transaction in the verification information having the first identifier, the transaction verification result may be separately stored (S413). Subsequently, if the transaction verification result is successful, the verification node 300 may transmit a signal allowing the update of the virtual asset to the VASP #2 node 220 (S415). In this case, the verification node 300 may transmit the transaction data including the second identifier, the sender's address, the recipient's electronic wallet address, the virtual asset type, and the quantity of virtual assets to the VASP #2 node 220. Also, if the transaction verification result is a fail, the verification node 300 may transmit a virtual asset update pending signal to the VASP #2 node 220.

Update Account at Recipient's VASP

When the VASP #2 node 220 receives the virtual asset update allowing signal from the verification node 300, the VASP2 node may add the quantity of virtual assets to the virtual assets of the recipient corresponding to the received virtual asset type based on the recipient's electronic wallet address and the type and quantity of virtual assets included in the transaction data to update the virtual assets of the recipient (S417). On the other hand, when the VASP #2 node 220 receives the virtual asset update pending signal, the VASP #2 node 220 may withhold the virtual asset update of the recipient without increasing the virtual asset of the recipient.

Advantage—Anti Money Laundering

According to the above described embodiments, if the verification of the sender, verification of the recipient, and verification of the transaction are all successful, the virtual asset is normally transmitted to the recipient and the recipient's virtual asset is updated, so that the effect of preventing the situation, in which virtual assets are transferred to the criminal group such as terrorists, and money laundering can be obtained.

In some embodiments, the verification node 300 performs transaction verification and recipient verification, stores and manages verification information, and allows the VASP nodes 210 and 220 to join as members, thereby obtaining the advantage of integrating and managing virtual currency transactions performed between VASP nodes while complying with the obligations required by the FATF.

Storing Metadata on Blockchain

As another embodiment, metadata including the first identifier may be stored in the blockchain of the virtual asset. In this case, the VASP #1 node 210 may transmit the transaction data including the metadata including the first identifier, the second identifier, and transmission related information to the blockchain network 400 to transmit the transaction record request for the transmission of the virtual asset to the blockchain network 400.

Processing Transaction Data Using Transaction Identifier

Including Transaction Identifier(s) in Transaction Data

Figure 6:
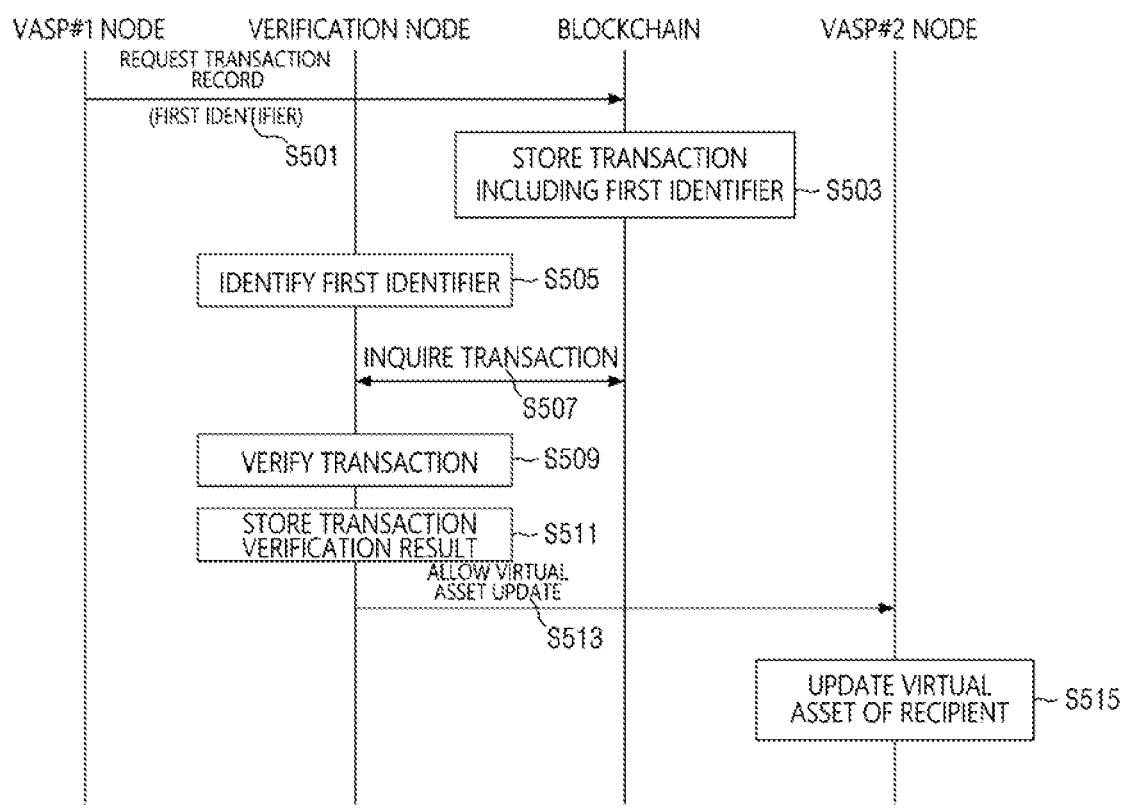
FIG. 6 is a signal flow diagram illustrating a method for mediating virtual asset transmission according to another embodiment of the present disclosure.

FIG. 6 is a signal flow diagram for describing a method of mediating virtual asset transmission according to another embodiment of the present disclosure. Referring to FIG. 6, when the verification result of the recipient is successful, the VASP #1 node 210 may prepare, as a response to the verification success, transaction data including metadata including a first identifier, a second identifier and transmission related information, and transmit a transaction record request message including the transaction data to the blockchain network 400 (S501). The first identifier (verification identifier) may be an ID for verification information, and the second identifier may be a hash of a transaction related to the transmission. In addition, the transmission related information may include one or more items among the sender's address (e.g., electronic wallet address), the recipient's electronic wallet address, the virtual asset type, and the quantity of virtual assets to be transmitted.

Then, each node 410-N of the blockchain network 400 connects the new block including the metadata, the second identifier and the transaction data to the existing block, so that a transaction including the metadata and related to the transmission of the virtual asset can be stored in the blockchain (S503).

Verifying Blockchain Record Based on Metadata in Blockchain Record

Subsequently, the verification node 300 may identify the first identifier from the stored verification information (S505), and inquire one or more transactions including metadata corresponding to the first identifier in the blockchain (S507). That is, when the VASP #1 node 210 responds to the transmission of the verification result (that is, the recipient verification is successful) by recording the transaction corresponding to the transmission of the virtual asset scheduled to be transmitted in the blockchain, the verification node 300, as a result of the response, may determine whether a transaction related to the transmission of the virtual asset scheduled to be transmitted has been recorded in the blockchain. The verification node 300 may obtain metadata included in at least one transaction among the transactions recorded in the blockchain, and check whether the obtained metadata includes information corresponding to the first identifier, thereby finding transaction including metadata including information corresponding to the first identifier in the blockchain.

Next, when it is determined that the transaction corresponding to the metadata is recorded in the blockchain, the verification node 300 may extract transmission related information from the transaction including the metadata. Then, the verification node 300 may identify one or more specific first items in the information of the virtual asset scheduled to be transmitted that is received from the VASP #1 node 210, and identify one or more specific second items in the transmission related information extracted from the transaction of the blockchain, and then determine whether the first item and the second item correspond to each other, thereby verifying whether a transaction corresponding to the transmission of the virtual asset is recorded in the blockchain (S509). The verification node 300 may determine that the transaction verification is successful if the first item and the second item correspond to each other, and may determine that the transaction verification is a fail if the first item and the second item do not correspond to each other. At this time, when the first item and the second item match or the first item and the second item are mapped and recorded in the verification information, the verification node 300 may determine that the first item and the second item correspond to each other.

Verifying Blockchain Record without Using Transaction Hash

Referring to FIG. 6, the verification node 300 may confirm the transaction recorded at S503 (blockchain record) based on the first identifier that is included in the metadata of the blockchain record, and may not use a separate identifier (e.g., the second identifier as in the process of FIG. 5). So, the verification node 300 may not need to receive a separate blockchain record request including an identifier for use in blockchain record verification because the verification node 300 has already received the first identifier during the recipient process of FIG. 4. However, when the blockchain network does not allow the VASP #1 node 210 to record the first identifier in metadata of blockchain record, in embodiments, the verification node 300 may need to receive the second identifier for use in verifying the blockchain record.

Actions Subsequent to Verifying Data on Blockchain

Next, the verification node 300 may separately store the transaction verification result by additionally including the verification result of the transaction in verification information having the first identifier (S511). Next, if the transaction verification result is successful, the verification node 300 may transmit a signal allowing the update of the virtual asset of the recipient to the VASP #2 node 220 (S513). In this case, the verification node 300 may transmit the transaction data including the second identifier, the sender's address, the recipient's electronic wallet address, the virtual asset type, and the quantity of virtual assets to the VASP #2 node 220. Also, if the transaction verification result is a fail, the verification node 300 may transmit a virtual asset update pending signal to the VASP #2 node 220.

Verification Node Storing Transaction History

In some embodiments, the verification node 300 stores record of every virtual asset transmission (transaction) made using the verification node 300. After the verification node 300 determines that a virtual asset transmission is recorded on the blockchain network (S411, S509), the verification node 300 stores data of the virtual asset transmission on a database. The virtual asset transmission record may include data about the sender that the sender-side VASP needs to provide under the Travel Rule and data about the about the recipient (beneficiary) that the recipient-side VASP needs to provide the Travel Rule. For example, the virtual asset transmission record may include one or more of sender name, sender's account number, sender's physical address, sender's nationality identity number, customer identification number, or other unique identification number, sender's date of birth, and sender's place of birth. The virtual asset transmission record may include recipient name and an account number of recipient's virtual wallet. The verification node 300 stores the virtual asset transmission record on a database that is not directly accessible from the VASP nodes 210, 220 such that VASPs may not modify the record. The virtual asset transmission record may be used to track and verify a virtual asset transmission for anti money laundering investigation.

Updating Recipient's Account

Next, when the VASP #2 node 220 receives a virtual asset update allowing signal from the verification node 300, the VASP #2 node may add the quantity of the virtual asset to the virtual asset of the recipient corresponding to the received virtual asset type based on the recipient's electronic wallet address and the type and quantity of the virtual asset included in the transaction data to update the virtual asset of the recipient (S515). On the other hand, when receiving the virtual asset update pending signal, the VASP #2 node 220 may withhold the virtual asset update without increasing the virtual asset of the recipient.

Advantage—Simple Process with Less Communications

According to this embodiment, transaction verification can be easily performed using the first identifier, and the effect of simplifying the protocol between nodes can be exerted.

Holding Process for Non-Member VASP

On the other hand, when the VASP #2 node 220 managing the virtual asset of the recipient is not a member, the recipient verification may be performed later.

Storing Transaction on Blockchain

Figure 7:
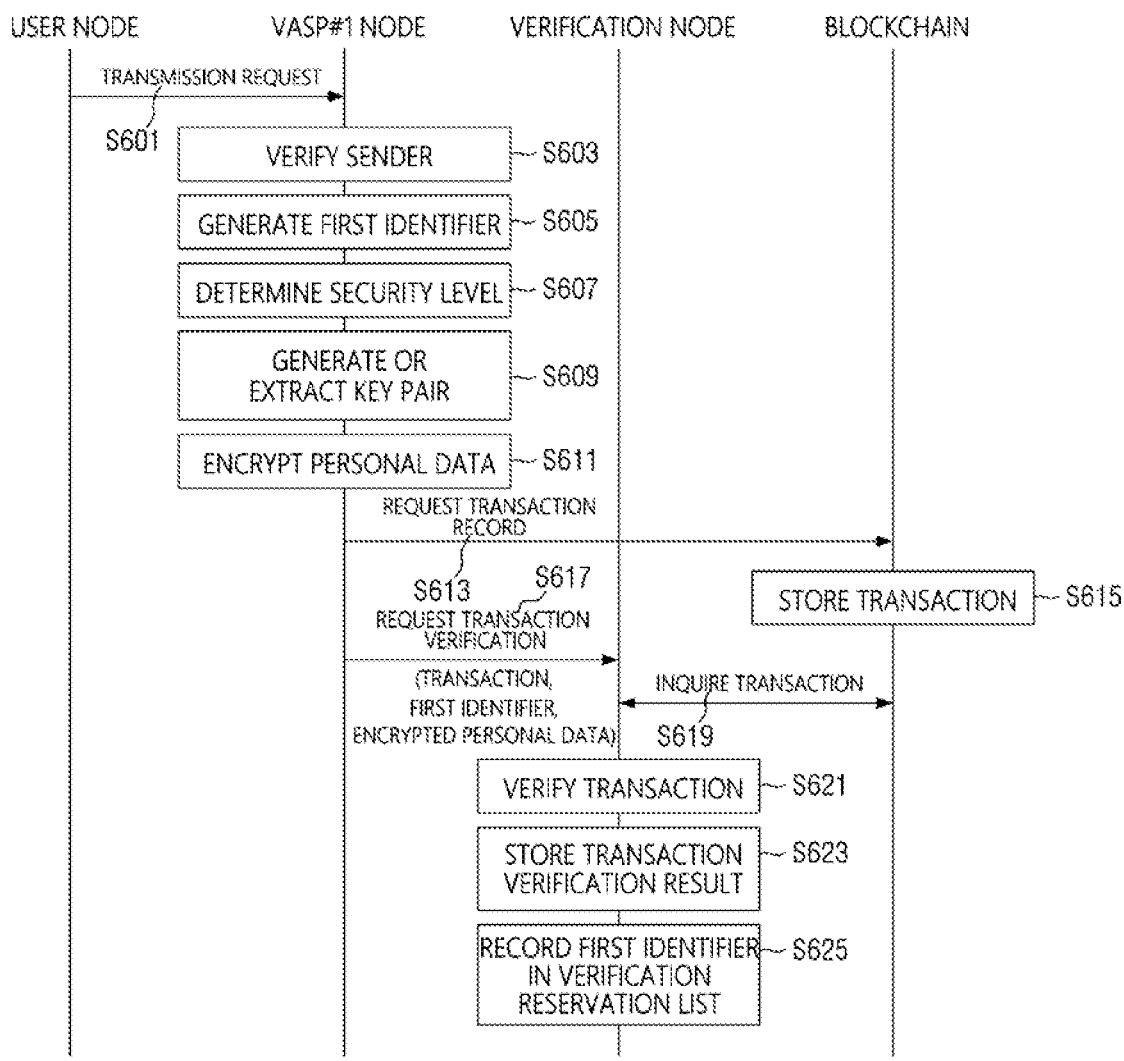
FIG. 7 is a signal flow diagram for describing a method of storing a transaction in a blockchain according to another embodiment of the present disclosure.

FIG. 7 is a signal flow diagram for describing a method of storing a transaction in a blockchain according to another embodiment of the present disclosure.

Sender's Transmission Request

Referring to FIG. 7, in a state, in which the VASP #2 node 220 is not joined to the member of the verification node 300, the user node 100 may initiate a transmission procedure. That is, the user node 100 may receive the type of virtual asset to be transmitted, the quantity of virtual asset, and the recipient's electronic wallet address from the user (i.e., sender), and transmit a transmission request message including the sender's address, the type of virtual asset, the quantity of virtual asset, and the recipient's electronic wallet address to the VASP #1 node 210 (S601). In this case, the user node 100 may transmit the name of the VASP #2 node 220 that is not registered as a member to the VASP #1 node 210.

Sender Verification

Upon receiving the transmission request message, the VASP #1 node 210 may perform sender verification (S603). As described above, the VASP #1 node 210 may verify the sender using various authentication methods. When the verification is successful, the VASP #1 node 210 may generate a first identifier (S605). Next, the VASP #1 node 210 may determine a security level applied to the transmission of the virtual asset from among a plurality of security levels (S607). In addition, the VASP #1 node 210 may generate a new key pair (i.e., a private key and a public key) or extract an already generated key pair according to the determined security level (S609). The VASP #1 node 210 may map and store the first identifier and the key pair.

Encrypting Personal Data for Asset Transfer

Next, the VASP #1 node 210 may encrypt personal data including recipient information and sender information using the generated or extracted private key (S611). Subsequently, the VASP #1 node 210 may prepare transaction data including the transmission related information of the virtual asset and the second identifier, and transmit a transaction record request message including the transaction data to the blockchain network 400 (S613). The transmission related information may include a sender's address, a recipient's electronic wallet address, a virtual asset type, and a quantity of virtual assets. In some embodiments, the VASP #1 node 210 may transmit a transaction record request message including metadata including the first identifier, the second identifier, and the transmission related information to the blockchain network 400.

Storing Transaction Data on Blockchain

Next, each of the nodes 410-N of the blockchain network 400 performs mining and connects the new block including the transaction data to the existing block, thereby storing the transaction data in the blockchain (S615).

When mining is stabilized, the VASP #1 node 210 may transmit the transaction verification request message including the transaction data, the first identifier, the second identifier, the security level, the encrypted personal data, and the generated or extracted public key and the verification result of the sender to the verification node 300 (S617).

Verifying Data Recordation on Blockchain

The verification node 300 may generate and store the verification information that includes the verification result of the sender, transaction data, the public key (i.e., the public key of the VASP #1 node), the encrypted personal data, a first identifier and a second identifier, and has the first identifier including the identification code of the VASP #1 node 210 as the sender-side VASP identification code. Since the VASP #2 node 220 is not a member and a member is not assigned to the VASP #2 node 220, the identification code of the receiver-side VASP node may not be recorded in the verification information.

Next, the verification node 300 may identify the second identifier in the transaction data included in the transaction verification request message, and inquire the transaction corresponding to the second identifier in the blockchain network 400 to verify whether the transaction is recorded in the blockchain (S619, S621). When it is determined that the transaction corresponding to the second identifier is recorded in the blockchain, the verification node 300 may extract transmission related information from the transaction corresponding to the second identifier. Next, the verification node 300 may identify one or more specific first items in the transmission related information included in the transaction data received from the VASP #1 node 210, and identify one or more specific second items in the transmission related information extracted from the transaction of the blockchain, and then determine whether the first item and the second item correspond to each other, thereby verifying whether a transaction corresponding to the transmission of the virtual asset is recorded in the blockchain.

In another embodiment, the verification node 300 may identify a first identifier from transaction data, and inquire one or more transactions including metadata corresponding to the first identifier in the blockchain. At this time, the verification node 300 may obtain metadata included in at least one or more transactions among the transactions recorded in the blockchain, and check whether the obtained metadata includes information corresponding to the first identifier, thereby finding transaction including metadata including information corresponding to the first identifier in the blockchain. And, when it is determined that the transaction corresponding to the metadata is recorded in the blockchain, the verification node 300 may extract transmission related information from the transaction including the metadata. In addition, the verification node 300 may extract one or more specific first items from the transmission related information included in the transaction data received from the VASP #1 node 210, and extract one or more specific second items in the transmission related information extracted from the transaction of the blockchain. And the verification node 300 may identify one or more specific second items from the transmission related information extracted from the transaction of the block chain, and determine whether the first item and the second item correspond to each other, thereby verifying whether the transaction corresponding to the transmission of the virtual asset is recorded in the blockchain. The verification node 300 may determine that the transaction verification is successful if the first item and the second item correspond to each other, and determine that the transaction verification is a fail if the first item and the second item do not correspond to each other.

Next, the verification node 300 may store the transaction verification result by additionally including the verification result of the transaction in verification information including the first identifier (S623). Subsequently, the verification node 300 may record the first identifier and the security level in the recipient verification reservation list (S625).

Holding Process for Non-Member VASP

According to this embodiment, when transmission to VASP #2 node 220, which is non-member, is requested, transaction data is stored in the blockchain, and data related to recipient verification to be performed later may be stored in the verification reservation list of the verification node 300. Thereafter, when the VASP #2 node 220 joins as a member, the recipient verification may be performed.

Updating Account at Recipient's VASP

Figure 8:
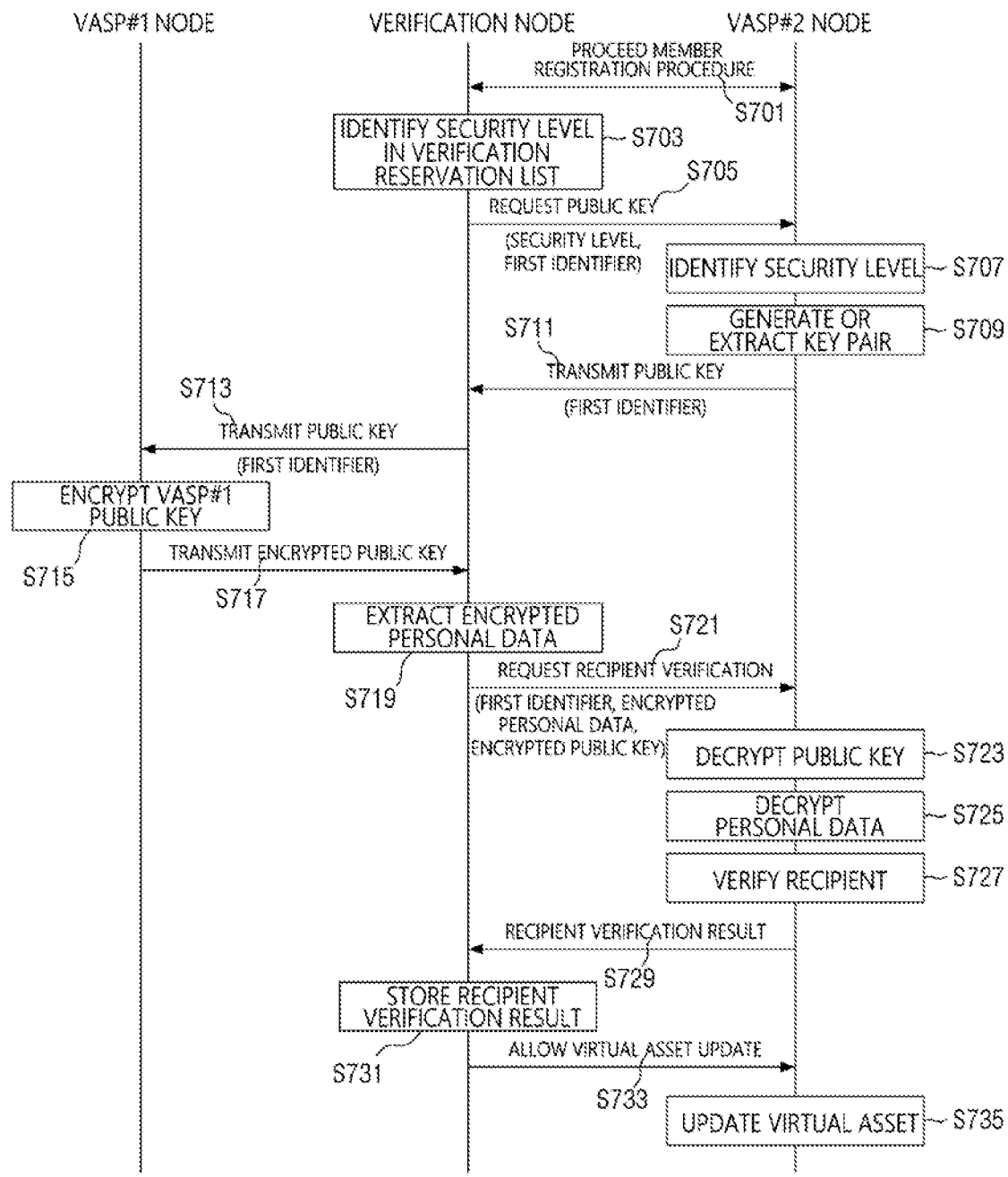
FIG. 8 is a signal flow diagram illustrating a method of mediating virtual asset transmission according to another embodiment of the present disclosure.

FIG. 8 is a signal flow diagram for describing a method for mediating virtual asset transmission according to another embodiment of the present disclosure.

VASP Member Registration

Referring to FIG. 8, when the verification node 300 receives a member registration request from the VASP #2 node 220, a membership registration procedure for the VASP #2 node 220 may proceed by receiving the required member data (nationality, IP address, physical address, identification number, etc.) from the VASP #2 node 220 and storing it, and assigning an identification code of the VASP #2 node 220 (S701).

Next, when the member registration procedure is normally completed, the verification node 300 may record the identification code of the recipient-side VASP node unrecorded in the verification information as the identification code of the VASP #2 node 220 and also identify the first identifier recorded in the verification node.

Public Key Request to Recipient's VASP

Next, the verification node 300 may identify the security level recorded in correspondence with the identified first identifier from the recipient verification reservation list (S703). In addition, the verification node 300 may transmit a public key request message including the security level and the first identifier to the VASP #2 node 220 (S705).

Public Key Generation at Recipient's VASP

Then, the VASP #2 node 220 may identify the security level included in the public key request message (S707). Next, the VASP #2 node 220 may generate a new key pair or extract an existing key pair according to the identified security level (S709). Next, the VASP #2 node 220 may transmit a public key from the extracted or generated key pairs to the verification node 300 together with the first identifier (S711), and map and store the first identifier and the key pair.

The verification node 300 may include the public key as a recipient-side public key in the verification information having the first identifier. And, the verification node 300 may transmit the public key and the first identifier to the VASP #1 node 210 (S713).

Encrypting Public Key at Sender's VASP

Then, the VASP #1 node 210 may extract the public key mapped to the first identifier, and use the received public key (that is, the public key of the VASP #2 node) as an encryption key to encrypt the extracted public key (that is, the public key of the VASP #1 node) (S715). Subsequently, the VASP #1 node 210 may transmit the encrypted public key and the first identifier to the verification node 300 (S717).

Recipient Verification Request to Recipient's VASP

Then, the verification node 300 may extract encrypted personal data from the verification information having the first identifier (S719), and transmit a recipient verification request message including the encrypted personal data, the first identifier, and the encrypted public key to the VASP #2 node 220 (S721).

Recipient Verification at Recipient's VASP

The VASP #2 node 220 may use the private key mapped with the first identifier to decrypt the encrypted public key included in the recipient verification request message (S723). In addition, the VASP #2 node 220 may decrypt the encrypted personal data using the decrypted public key (S725). Subsequently, the VASP #2 node 220 may verify the recipient by identifying recipient information in the decrypted personal data and determining whether the subscriber information managed by the VASP #2 node 220 matches the recipient information (S727). The VASP #2 node 220 may identify the recipient's electronic wallet address and name in the recipient information, and if the subscriber's information having both the electronic wallet address and name is stored, it may process the recipient verification as successful, otherwise process the recipient verification as a fail. Next, the VASP #2 node 220 may transmit the verification result of the recipient and the first identifier to the verification node 300 (S729).

Asset Update Request to Recipient's VASP

The verification node 300 that has received the verification result of the recipient and the first identifier may include the recipient verification result in the verification information having the first identifier and store them (S731), and also transmit the recipient verification result to the VASP #1 node 210. Next, if the recipient verification result is successful, the verification node 300 may transmit a signal allowing the update of the virtual asset of the recipient to the VASP #2 node 220 (S733). In this case, the verification node 300 may transmit the transaction data including the second identifier, the sender's address, the recipient's electronic wallet address, the virtual asset type, and the quantity of virtual assets to the VASP #2 node 220. In addition, if the verification result of the recipient is a fail, the verification node 300 may transmit a virtual asset update pending signal to the VASP #2 node 220.

Updating Recipient's Account at Recipient's VASP

When the VASP #2 node 220 receives the virtual asset update allowing signal from the verification node 300, the VASP #2 node 220 may add the quantity of the virtual assets to the virtual assets of the recipient corresponding to the type of the received virtual asset based on the recipient's electronic wallet address, virtual asset type, and quantity of virtual assets included in the transaction data to update the virtual assets of the recipient (S735). On the other hand, when the VASP #2 node 220 receives the virtual asset update pending signal, the VASP #2 node 220 may withhold the virtual asset of the recipient without increasing it.

In the embodiment with reference to FIG. 8, although the VASP #1 node 210 uses the public key generated by the VASP #2 node 220 as an encryption key to encrypt the public key generated by the VASP #1 node 220 and transmits it to the verification node 300, the VASP #1 node 210 may encrypt personal data using the public key of the VASP #2 node 220 received from the verification node 300 and provide the encrypted personal data to the VASP #2 node 220, as will be described later with reference to FIG. 9.

According to this embodiment, even if the recipient-side VASP #2 node 220 joins as a member later, the recipient can be reliably verified. In addition, according to the present embodiment, since the personal data is encrypted using the public key used in the security level and transmitted to the VASP #2 node 220, the effect of enhancing data security can be obtained.

Figure 9:
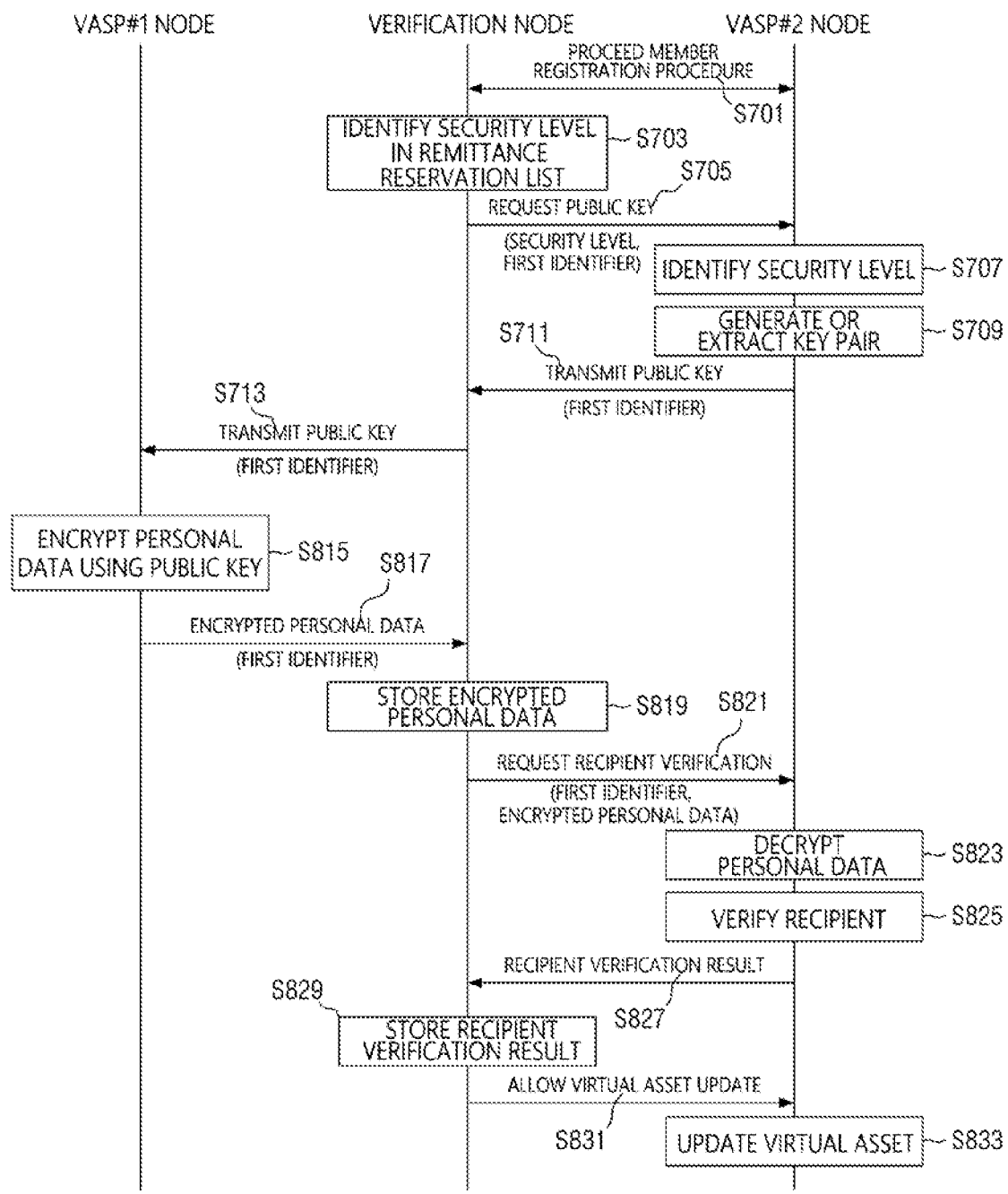
FIG. 9 is a signal flow diagram illustrating a method of mediating virtual asset transmission according to another embodiment of the present disclosure.

Alternative Process to Update Recipient's Account (FIG. 9)

FIG. 9 is a signal flow diagram illustrating a method of mediating virtual asset transmission according to another embodiment of the present disclosure. In FIG. 9, steps S701 to S713 having the same reference numerals as those of FIG. 8 are substantially the same as the descriptions with reference to FIG. 8, so the description of the steps having the same reference numerals is omitted, and only the steps having different reference numerals will be described.

Encrypting Personal Data Using Public Key

Referring to FIG. 9, when the VASP #1 node 210 receives the public key of the VASP #2 node 220, the VASP #1 node 210 may encrypt personal data including the recipient information and the sender information using the received public key (S815). Subsequently, the VASP #1 node 210 may transmit the encrypted personal data and the first identifier to the verification node 300 (S817).

Storing Encrypted Personal Data (S817)

Then, the verification node 300 may additionally include and store the encrypted personal data in the verification information having the first identifier (S819). In addition, the VASP #1 node 210 may transmit a recipient verification request message including the personal data encrypted with the public key of the VASP #2 node 220 and the first identifier to the VASP #2 node 220 (S821).

Processing of Encrypted Personal Data at Recipient's VASP

Then, the VASP #2 node 220 may decrypt the encrypted personal data using the private key mapped to the first identifier (S823). Subsequently, the VASP #2 node 220 may identify the recipient information in the decrypted personal data and determine whether the subscriber information managed by itself and the decrypted recipient information match, thereby verifying the recipient (S825). Subsequently, the VASP #2 node 220 may transmit the verification result of the recipient and the first identifier to the verification node 300 (S827).

Storing Recipient Verification (S829)

The verification node 300 that has received the verification result of the recipient and the first identifier may include and store the recipient verification result in the verification information having the first identifier (S829), and also transmit the recipient verification result to the VASP #1 node 210. Next, if the recipient verification result is successful, the verification node 300 may transmit a signal allowing the update of the virtual asset to the VASP #2 node 220 (S831). In this case, the verification node 300 may transmit the transaction data including the second identifier, the sender's address, the recipient's electronic wallet address, the virtual asset type, and the quantity of virtual assets to the VASP #2 node 220. In addition, if the verification result of the recipient is a fail, the verification node 300 may transmit a virtual asset update pending signal to the VASP #2 node 220.

Updating Account at Recipient's VASP

When the VASP #2 node 220 receives a virtual asset update allowing signal from the verification node 300, the VASP #2 node 220 may add the quantity of the virtual assets to the virtual assets of the recipient corresponding to the type of the virtual assets based on the recipient's electronic wallet address, virtual asset type, and quantity of virtual assets included in the transaction data to update the virtual asset of the recipient (S833). On the other hand, when the VASP #2 node 220 receives the virtual asset update pending signal, the VASP #2 node 220 may withhold the virtual asset of the recipient without increasing it.

Computing Device

Figure 10:
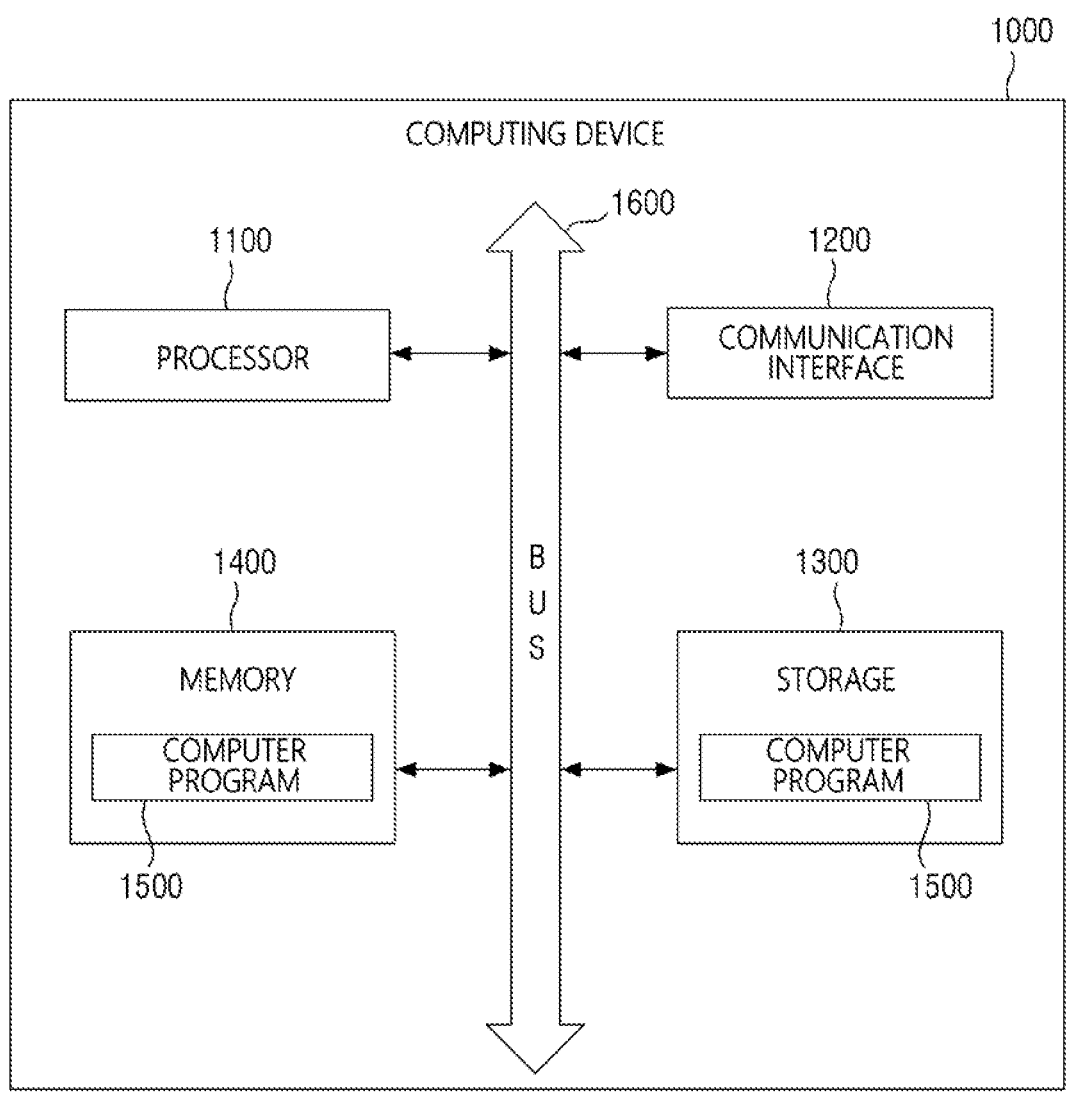
FIG. 10 is an example hardware configuration diagram that may implement a computing device in various embodiments.

Hereinafter, an example computing device that can implement an apparatus and a system, according to various embodiments will be described with reference to FIG. 10. FIG. 10 is an example hardware configuration diagram that may implement a computing device in various embodiments. As shown in FIG. 10, the computing device 1000 may include one or more processors 1100, a system bus 1600, a communication interface 1200, a memory 1400, which loads a computer program 1500 executed by the processors 1100, and a storage 1300 for storing the computer program 1500. However, FIG. 10 illustrates only the components related to the embodiment of the present disclosure. It will be appreciated by those skilled in the art that the present disclosure may further include other general purpose components in addition to the components shown in FIG. 10.

Processor

The processor 1100 may control overall operations of each component of the computing device 1000. The processor 1100 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1100 may perform calculations on at least one application or program for executing a method/operation according to various embodiments of the present disclosure. The computing device 1000 may have one or more processors.

Memory

The memory 1400 may store various data, instructions and/or information. The memory 1400 may load one or more programs 1500 from the storage 1300 to execute methods/operations according to various embodiments of the present disclosure. An example of the memory 1400 may be a RAM, but may not be limited thereto.

Communication Bus

The bus 1600 may provide communication between components of the computing device 1000. The bus 1600 may be implemented as various types of bus such as an address bus, a data bus and a control bus. The communication interface 1200 supports wired and wireless internet communication of the computing device 1000. The communication interface 1200 may support various communication methods other than internet communication. To this end, the communication interface 1200 may be configured to comprise a communication module well known in the art of the present disclosure. The storage 1300 can non-temporarily store one or more computer programs 1500. The storage 1300 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

Computer Program

The computer program 1500 may include one or more instructions, on which the methods/operations according to various embodiments of the present disclosure may be implemented. Based on the computer program 1500 being loaded on the memory 1400, the processor 1100 may perform the methods/operations in accordance with various embodiments by executing the one or more instructions.

The computer program 1500 may include instructions for performing the operations of the VASP #1 node 210, the VASP #2 node 220, or the verification node 300 described above. That is, the computer program 1500 may include one or more instructions for performing the methods/operations according to the VASP #1 node 210, or one or more instructions for performing the methods/operations according to the VASP #2 node 220 or one or more instructions for performing a methods/operations of the verification node 300.

In the above description, it may be described that all the components constituting the embodiments of the present disclosure may be combined or operated as one, but the technical features of the present disclosure may not be limited to these embodiments. That is, within the scope of the present disclosure, all of the components may be selectively combined and operated in one or more combinations.

Computer Program Instructions on Non-Transitory medium

The technical features of the embodiments described so far may be embodied as computer readable codes on a non-transitory computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, and being used in the other computing device.

OTHER CONSIDERATIONS

Although the implementations of the inventions have been disclosed in the context of certain implementations and examples, it will be understood by those skilled in the art that the present inventions extend beyond the specifically disclosed implementations to other alternative implementations and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or sub-combinations of the specific features and aspects of the implementations may be made and still fall within one or more of the inventions. Accordingly, it should be understood that various features and aspects of the disclosed implementations can be combined with or substituted for one another in order to form varying modes of the disclosed inventions. Thus, it is intended that the scope of the present inventions herein disclosed should not be limited by the particular disclosed implementations described above, and that various changes in form and details may be made without departing from the spirit and scope of the present disclosure as set forth in the following claims.

What is claimed is:

1. A method for use in a virtual asset transmission from a first account of a first user at a first virtual asset service provider (VASP) to a second account of a second user at a second virtual asset service provider (VASP), the method comprising:

receiving, by a verification node comprising a computing device connected to a computer communication network comprising a blockchain network, information about the second user which comprises an account number of the second account at the second VASP;

sending, by the verification node to the second VASP, a first request for verifying the information about the second user to cause the second VASP to process verification of the information about the second user;

receiving, by the verification node from the second VASP, an electronic verification result confirming that the information about the second user is valid;

subsequently receiving, by the verification node from the first VASP, a second request for verifying a blockchain record for a transmission of a virtual asset from the first user to the second user, wherein the second request for verifying the blockchain record comprises transaction information associated with the transmission;

upon receipt of the second request for verifying a blockchain record, determining, by the verification node, if the transmission has been recorded on the blockchain network, wherein determining uses at least part of the transaction information received from the first VASP; and upon determining that the transmission has been recorded on the blockchain network, sending, by the verification node to the second VASP, a third request to update the second account of the second user at the second VASP about the transmission of the virtual asset from the first user to the second user, wherein the verification node does not belong to either the first VASP or the second VASP.

2. The method of claim 1, wherein subsequent to the transmission, the verification node electronically stores in a storage device a transaction record comprises two or more selected from the group consisting of a type of the virtual asset, a quantity of the virtual asset, a name of the first user, a nationality of the first user, an address of the first user, an account number of the first user at the first VASP, the date of birth of the first user, the place of birth of the first user, a name of the second user, and the account number of the second user at the second VASP, wherein the storage device does not belong to either the first VASP or the second VASP.

3. The method of claim 1, wherein subsequent to the verification node's receipt of the electronic verification result and prior to the verification node's receipt of the second request for verifying a blockchain record, the first VASP initiates recordkeeping for the transmission of the virtual asset from the first user to the second user in the blockchain network.

4. The method of claim 1, wherein subsequent to the verification node's receipt of the electronic verification result and prior to the verification node's receipt of the second request for verifying a blockchain record, a transaction record for the transmission of the virtual asset from the first user to the second user is recorded in the blockchain network, wherein the transaction record for the transmission comprises two or more selected from the group consisting of a type of the virtual asset, a quantity of the virtual asset, a name of the first user, a nationality of the first user, an address of the first user, an account number of the first user at the first VASP, the date of birth of the first user, the place of birth of the first user, a name of the second user, and the account number of the second user at the second VASP.

5. The method of claim 4, wherein the transaction record is recorded in the blockchain network in response to a fourth request for keeping the transaction record in the blockchain network.

6. The method of claim 5, wherein a blockchain transaction identifier for identifying the transaction record is generated using at least part of data contained in the fourth request for keeping the transaction record in the blockchain network.

7. The method of claim 6, wherein the fourth request is made by the first VASP, wherein the blockchain transaction identifier is generated by the first VASP.

8. The method of claim 6, wherein the transaction information from the first VASP comprises the blockchain transaction identifier, wherein the verification node's determining comprises:

communicating with the blockchain network to receive at least part of the transaction record; and processing the at least part of the transaction record received from the blockchain network, wherein the verification node determines that the transmission has been recorded on the blockchain network if the at least part of the transaction record generates a code identical to the blockchain transaction identifier.

9. The method of claim 1, wherein, prior to the verification node's receipt of the information about the second user, the first VASP assigns a unique identifier to a then-future transaction in response to the first user's request to the first VASP for the transmission of the virtual asset to the second user and then sends the information about the second user and the unique identifier to the second VASP.

10. The method of claim 1, wherein the information about the second user received from the first VASP is encrypted, wherein the verification node sends the encrypted information about the second user to the second VASP with the first request for verifying the information about the second user.

11. The method of claim 1, wherein, prior to receiving the information about the second user, the verification node sends to the second VASP a fourth request for a public key for a then-future transaction, receives a public key for the then-future transaction from the second VASP, and forwards the public key to the first VASP, wherein the then-future transaction is the transmission of the virtual asset from the first user to the second user.

12. The method of claim 11, wherein the information about the second user received from the first VASP is encrypted using the public key, wherein the verification node sends the encrypted information about the second user to the second VASP with the first request for verifying the information about the second user, which causes the second VASP to decrypt the encrypted information using the public key and process verification of the information about the second user.

13. A method for use in a virtual asset transmission from a first account of a first user at a first virtual asset service provider (VASP) to a second account of a second user at a second virtual asset service provider (VASP), the method comprising:

receiving, by a verification node comprising a computing device connected to a computer communication network comprising a blockchain network, information about the second user and a unique identifier assigned to a then-future transaction for a transmission of a virtual asset from the first user to the second user, wherein the information about the second user comprises an account number of the second account at the second VASP;

sending, by the verification node to the second VASP, a first request for verifying the information about the second user to cause the second VASP to process verification of the information about the second user;

receiving, by the verification node from the second VASP, an electronic verification result confirming that the information about the second user is valid;

subsequently communicating with the blockchain network, by the verification node, to determine if the transmission has been recorded on the blockchain network, wherein determining comprises uses the unique identifier assigned to the transmission; and upon determining that the transmission has been recorded on the blockchain network, sending, by the verification node to the second VASP, a second request to update the second account of the second user at the second VASP about the transmission of the virtual asset from the first user to the second user, wherein the verification node does not belong to either the first VASP or the second VASP.

14. The method of claim 13, wherein subsequent to the transmission, the verification node electronically stores in a storage device a transaction record comprises two or more selected from the group consisting of a type of the virtual asset, a quantity of the virtual asset, a name of the first user, a nationality of the first user, an address of the first user, an account number of the first user at the first VASP, the date of birth of the first user, the place of birth of the first user, a name of the second user, and the account number of the second user at the second VASP, wherein the storage device does not belong to either the first VASP or the second VASP.

15. The method of claim 13, wherein subsequent to the verification node's receipt of the electronic verification result and prior to the verification node's receipt of a third request for verifying a blockchain record, the first VASP initiates recordkeeping for the transmission of the virtual asset from the first user to the second user in the blockchain network.

16. The method of claim 13, wherein subsequent to the verification node's receipt of the electronic verification result and prior to the verification node's receipt of a third request for verifying a blockchain record, a transaction record for the transmission of the virtual asset from the first user to the second user is recorded in the blockchain network, wherein the transaction record for the transmission comprises the unique identifier and two or more selected from the group consisting of a type of the virtual asset, a quantity of the virtual asset, a name of the first user, a nationality of the first user, an address of the first user, an account number of the first user at the first VASP, the date of birth of the first user, the place of birth of the first user, a name of the second user, and the account number of the second user at the second VASP.

17. The method of claim 16, wherein the transaction record is recorded in the blockchain network in response to a fourth request for keeping the transaction record in the blockchain network, wherein the fourth request is made by the first VASP.

18. The method of claim 13, wherein the information about the second user received from the first VASP is encrypted, wherein the verification node sends the encrypted information about the second user to the second VASP with the first request for verifying the information about the second user.

19. The method of claim 13, wherein, prior to receiving the information about the second user, the verification node sends to the second VASP a third request for a public key for a then-future transaction, receives a public key for the then-future transaction from the second VASP, and forwards the public key to the first VASP, wherein the then-future transaction is the transmission of the virtual asset from the first user to the second user.

20. The method of claim 19, wherein the information about the second user received from the first VASP is encrypted using the public key, wherein the verification node sends the encrypted information about the second user to the second VASP with the first request for verifying the information about the second user, which causes the second VASP to decrypt the encrypted information using the public key and process verification of the information about the second user.

* * * * *